United States Patent
Agrafiotis et al.

(10) Patent No.: US 6,571,227 B1
(45) Date of Patent: May 27, 2003

(54) METHOD, SYSTEM AND COMPUTER PROGRAM PRODUCT FOR NON-LINEAR MAPPING OF MULTI-DIMENSIONAL DATA

(75) Inventors: Dimitris K. Agrafiotis, Downington, PA (US); Victor S. Lobanov, Yardley, PA (US); Francis R. Salemme, Yardley, PA (US)

(73) Assignee: 3-Dimensional Pharmaceuticals, Inc., Exton, PA (US)

(*) Notice: Subject to any disclaimer, the term of this patent is extended or adjusted under 35 U.S.C. 154(b) by 0 days.

(21) Appl. No.: 09/303,671

(22) Filed: May 3, 1999

Related U.S. Application Data

(63) Continuation-in-part of application No. 09/073,845, filed on May 7, 1998, now Pat. No. 6,453,246, which is a continuation-in-part of application No. 08/963,872, filed on Nov. 11, 1997, now Pat. No. 6,295,514.
(60) Provisional application No. 60/130,187, filed on Nov. 4, 1996.

(51) Int. Cl.[7] .............................. G06E 1/00; G06E 3/00; G06F 15/18; G06G 7/00; G06N 3/02
(52) U.S. Cl. .......................................... 706/15; 707/100
(58) Field of Search ............................. 706/15, 16, 17; 707/100

(56) References Cited

U.S. PATENT DOCUMENTS

| | | | |
|---|---|---|---|
| 4,773,099 A | 9/1988 | Bokser | 382/225 |
| 4,811,217 A | 3/1989 | Tokizane et al. | 364/300 |
| 4,859,736 A | 8/1989 | Rink | 525/54 P |
| 4,908,773 A | 3/1990 | Pantoliano et al. | 702/138 |

(List continued on next page.)

FOREIGN PATENT DOCUMENTS

| | | | | |
|---|---|---|---|---|
| EP | 0 355 266 B1 | 6/1993 | | B01J/19/00 |
| EP | 0 355 628 B1 | 11/1993 | | G21F/9/00 |
| EP | 0 770 876 A1 | 5/1997 | | G01N/33/68 |
| EP | 0 818 744 A2 | 1/1998 | | G06F/17/50 |
| WO | WO 91/19735 | 12/1991 | | C07K/7/02 |
| WO | WO 92/00091 | 1/1992 | | A61K/37/02 |
| WO | WO 93/20242 | 10/1993 | | C12Q/1/70 |
| WO | WO 94/28504 | 12/1994 | | G06F/15/60 |
| WO | WO 95/01606 | 1/1995 | | G06F/15/42 |
| WO | WO 97/09342 | 3/1997 | | C07H/21/02 |
| WO | WO 97/20952 | 6/1997 | | C12Q/1/68 |
| WO | WO 97/27559 | 7/1997 | | G06F/19/00 |
| WO | WO 98/20437 | 5/1998 | | G06F/17/50 |
| WO | WO 98/20459 | 5/1998 | | G06T/11/20 |

OTHER PUBLICATIONS

Vicent W. Porto et al, Alternative Neural Network Training Methods, 1995, IEEE, pp. 16–22.*

Anil K. Jain et al, Artificial Neural Networks: A Tutorial, 1996, IEEE, pp. 31–44.*

(List continued on next page.)

Primary Examiner—John Follansbee
Assistant Examiner—Joseph P. Hirl
(74) Attorney, Agent, or Firm—Sterne, Kessler, Goldstein & Fox

(57) ABSTRACT

A method, system and computer program product for scaling, or dimensionally reducing, multi-dimensional data sets, that scales well for large data sets. The invention scales multi-dimensional data sets by determining one or more non-linear functions between a sample of points from the multi-dimensional data set and a corresponding set of dimensionally reduced points, and thereafter using the non-linear function to non-linearly map additional points. The additional points may be members of the original multi-dimensional data set or may be new, previously unseen points. In an embodiment, the invention begins with a sample of points from an n-dimensional data set and a corresponding set of m-dimensional points. Alternatively, the invention selects a sample of points from an n-dimensional data set and non-linearly maps the sample of points to obtain the corresponding set of m-dimensional points.

34 Claims, 25 Drawing Sheets

U.S. PATENT DOCUMENTS

| | | | |
|---|---|---|---|
| 4,935,875 A | 6/1990 | Shah et al. ................. | 702/22 |
| 4,939,666 A | 7/1990 | Hardman .................... | 700/293 |
| 5,010,175 A | 4/1991 | Rutter et al. ................ | 530/334 |
| 5,025,388 A | 6/1991 | Cramer, III et al. ........ | 700/293 |
| 5,155,801 A | 10/1992 | Lincoln ...................... | 706/20 |
| 5,167,009 A | 11/1992 | Skeirik ........................ | 706/23 |
| 5,181,259 A | 1/1993 | Rorvig ....................... | 382/225 |
| 5,240,680 A | 8/1993 | Zuckerman et al. .......... | 422/67 |
| 5,260,882 A | 11/1993 | Blanco et al. ................ | 703/6 |
| 5,265,030 A | 11/1993 | Skolnick et al. ............ | 703/11 |
| 5,270,170 A | 12/1993 | Schatz et al. .............. | 435/7.37 |
| 5,288,514 A | 2/1994 | Ellman ......................... | 435/4 |
| 5,307,287 A | 4/1994 | Cramer, III et al. ........... | 703/2 |
| 5,323,471 A | 6/1994 | Hayashi ..................... | 382/158 |
| 5,331,573 A | 7/1994 | Balaji et al. ................. | 703/11 |
| 5,434,796 A | 7/1995 | Weininger .................. | 703/12 |
| 5,436,850 A | 7/1995 | Eisenberg et al. ........... | 703/11 |
| 5,442,122 A | 8/1995 | Noda et al. ................. | 564/426 |
| 5,463,564 A | 10/1995 | Agrafiotis et al. ......... | 700/268 |
| 5,499,193 A | 3/1996 | Sugawara et al. ......... | 700/268 |
| 5,519,635 A | 5/1996 | Miyake et al. ............. | 700/285 |
| 5,524,065 A | 6/1996 | Yagasaki .................... | 382/226 |
| 5,526,281 A | 6/1996 | Chapman et al. ............. | 702/22 |
| 5,545,568 A | 8/1996 | Ellman ....................... | 436/518 |
| 5,549,974 A | 8/1996 | Holmes ...................... | 428/403 |
| 5,553,225 A | 9/1996 | Perry ......................... | 345/786 |
| 5,565,325 A | 10/1996 | Blake ......................... | 435/7.1 |
| 5,574,656 A | 11/1996 | Agrafiotis et al. ......... | 700/268 |
| 5,585,277 A | 12/1996 | Bowie et al. ............... | 436/518 |
| 5,598,510 A * | 1/1997 | Castelaz ..................... | 706/25 |
| 5,602,755 A | 2/1997 | Ashe et al. .................. | 702/30 |
| 5,602,938 A | 2/1997 | Akiyama et al. ........... | 382/155 |
| 5,612,895 A | 3/1997 | Balaji et al. ................. | 702/19 |
| 5,634,017 A | 5/1997 | Mohanty et al. ........... | 345/803 |
| 5,635,598 A | 6/1997 | Lebl et al. .................. | 530/334 |
| 5,670,326 A | 9/1997 | Beutel ........................ | 435/7.1 |
| 5,679,582 A | 10/1997 | Bowie et al. ............... | 436/518 |
| 5,684,711 A | 11/1997 | Agrafiotis et al. ........... | 702/27 |
| 5,703,792 A | 12/1997 | Chapman ..................... | 702/27 |
| 5,712,171 A | 1/1998 | Zambias et al. ............ | 436/518 |
| 5,712,564 A | 1/1998 | Hayosh ...................... | 324/210 |
| 5,734,796 A * | 3/1998 | Pao ............................. | 706/16 |
| 5,736,412 A | 4/1998 | Zambias et al. ............ | 436/518 |
| 5,740,326 A | 4/1998 | Boulet et al. ................. | 706/27 |
| 5,789,160 A | 8/1998 | Eaton et al. ................... | 435/6 |
| 5,807,754 A | 9/1998 | Zambias et al. ............ | 436/518 |
| 5,811,241 A | 9/1998 | Goodfellow et al. ......... | 435/7.1 |
| 5,832,494 A | 11/1998 | Egger et al. ................. | 707/102 |
| 5,845,225 A | 12/1998 | Mosher ...................... | 701/102 |
| 5,858,660 A | 1/1999 | Eaton et al. ................... | 435/6 |
| 5,861,532 A | 1/1999 | Brown et al. ............... | 564/142 |
| 5,866,334 A | 2/1999 | Beutel ........................... | 435/6 |
| 5,901,069 A | 5/1999 | Agrafiotis et al. .......... | 700/768 |
| 5,908,960 A | 6/1999 | Newlander .................. | 564/177 |
| 5,933,819 A | 8/1999 | Skolnick et al. ............. | 706/21 |
| 5,960,443 A | 9/1999 | Young et al. ................ | 707/104 |
| 5,995,938 A | 11/1999 | Whaley ........................ | 705/3 |
| 6,014,661 A | 1/2000 | Ahlberg et al. ................ | 707/3 |
| 6,026,397 A * | 2/2000 | Sheppard ...................... | 707/5 |
| 6,037,135 A | 3/2000 | Kubo et al. ................ | 435/7.24 |
| 6,049,797 A | 4/2000 | Guha et al. .................... | 707/6 |
| 6,185,506 B1 | 2/2001 | Cramer et al. ................ | 702/19 |

OTHER PUBLICATIONS

Copy of International Search Report for PCT/US99/09963, 7 pages.

Hosenpud, J.D. et al, "The Effect of Transplant Center Volume on Cardiac Transplant Outcome," *The Journal of the American Medical Association*, American Medical Society, vol. 271, No. 23, Jun. 1994, pp. 1844–1849.

"3DP gains drug research patent", Chemistry in Britain, The Royal Society of Chemistry, vol. 32, No. 1, Jan. 1996, 2 pages.

"Accelerate the Discovery Cycle with Chem–X!", Source and date of publication unclear, 2 pages.

Agrafiotis, D. K., et al., "Stochastic Algorithms for Maximizing Molecular Diversity", *Journal of Chemical Information and Computer Sciences*, American Chemical Society, vol. 37, pp. 841–851, (1997).

Alsberg, B.K. et al., "Classification of pyrolysis mass spectra by fuzzy multivariate rule induction–comparison with regression, K–nearest neighbour, neural and decision–tree methods", *Analytical Chimica Acta*, Elsevier Science B.V., vol. 348, No. 1–3, pp. 389–407, (Aug. 20, 1997).

Amzel, L.M., "Structure–based drug design," *Current Opinion in Biotechnology*, Current Biology Publications, vol. 9, No. 4, Aug. 1998, pp. 366–369.

Andrea, T.A. et al., "Applications of Neural Networks in Quantitative Structure–Activity Relationships of Dihydrofolate Reductase Inhibitors", *Journal of Medicinal Chemistry*, American Chemical Society, vol. 34, No. 9, pp. 2824–2836, (1991).

Aoyama, T. and Hiroshi Ichikawa, "Obtaining the Correlation Indices between Drug Activity and Structural Parameters Using a Neural Network", *Chemical & Pharmaceutical Bulletin*, Japan Publications Trading Co. (U.S.A.) Inc., vol. 39, No. 2, pp. 372–378, (1991).

Baum, R.M., "Combinatorial Approaches Provide Fresh Leads for Medicinal Chemistry", *Chemical & Engineering News*, American Chemical Society, Feb. 7, 1994, (pp. 20–26).

Bentley, J. L., "Multidimensional Binary Search Trees Used for Associative Searching", *Communications of the ACM*, Association for Computing Machinery, Inc., vol. 18, No. 9, pp. 509–517, (Sep. 1975).

Blaney, J.M. and Martin, E.J., "Computational approaches for combinatorial library design and molecular diversity analysis," *Current Opinion in Chemical Biology*, Current Biology Ltd., vol. 1, No. 1, Jun. 1997, pp. 54–59.

Bottou, L. and Vladimir Vapnik, "Local Learning Algorithms", *Neural Computation*, Massachusetts Institute of Technololgy, vol. 4, No. 6, pp. 888–900, (Nov. 1992).

Boulu, L.G. and Gordon M. Crippen, "Voronoi Binding Site Models: Calculation of Binding Modes and Influence of Drug Binding Data Accuracy", *Journal of Computational Chemistry*, Journal of Computational Chemistry, vol. 10, No. 5, pp. 673–682, (1989).

Boulu, L.G. et al., "Voronoi Binding Site Model of a Polycyclic Aromatic Hydrocarbon Binding Protein", *Journal of Medicinal Chemistry*, American Chemical Society, vol. 33, No. 2, pp. 771–775, (1990).

Brown, R. D. and Yvonne C. Martin, "Use of Structure–Activity Data To Compare Structure–Based Clustering Methods and Descriptors for Use in Compound Selection", *Journal of Chemical Information and Computer Sciences*, Advance ACS Abstracts, vol. 36, No. 3, pp. 572–584, (1996).

Cacoullos, T., "Estimation of a Multivariate Density", *Annals of The Institute of Statistical Mathematics*, The Institute of Statistical Mathematics, vol. 18, No. 2, pp. 179–189, (1966).

Caflisch, A. and Karplus, M., "Computational combinatorial chemistry for de novo ligand design: Review and assessment," *Perspectives in Drug Discovery and Design*, ESCOM Science Publishers B.V., vol. 3, 1995, pp. 51–84.

Clark, D. E., and David R. Westhead, "Evolutionary algorithms in computer–aided molecular design", *Journal of Computer–Aided Molecular Design*, ESCOM Science Publishers B.V., vol. 10, No. 4, pp. 337–358, (Aug. 1996).

Clark, R.D., "OptiSim: An Extended Dissimilarity Selection Method for Finding Diverse Representative Subsets", *Journal of Chemical Information and Computer Sciences*, American Chemical Society, vol. 37, No. 6, pp. 1181–1188 (12 Page Internet printout), 1997.

*Copy of International Search Report issued Apr. 21, 1998 for PCT/US97/20919.*

Copy of International Search Report issued May 13, 1998 for PCT/US97/20918.

Cramer, R. D. III et al., "Comparative Molecular Field Analyisis (CoMFA). 1. Effect of Shape on Binding of Steroids to Carrier Proteins", *Journal of The American Chemical Society*, American Chemical Society, vol. 110, No. 18, pp. 5959–5967, (Aug. 31, 1988).

Cramer, R. D. III et al., "Substructural Analysis. A Novel Approach to the Problem of Drug Design", *Journal of Medicinal Chemistry*, American Chemical Society, vol. 17, No. 5, pp. 533–535, (May 1974).

Crippen, G. M., "Voronoi binding Site Models", *Journal of Computational Chemistry*, John Wiley & Sons, Inc., vol. 8, No. 7, pp. 943–955, (Oct./Nov. 1987).

Eichler, U. et al., "Addressing the problem of molecular diversity," *Drugs of the Future*, Prouse Science, vol. 24, No. 2, 1999, pp. 177–190.

Felder, E.R. and Poppinger, D., "Combinatorial Compound Libraries for Enhanced Drug Discovery Approaches," *Advances in Drug Research*, Academic Press, vol. 30, 1997, pp. 112–199.

Friedman, J. H. et al., "An Algorithm for Finding Best Matches in Logarithmic Expected Time", *ACM Transactions on Mathematical Software*, Association for Computing Machinery, vol. 3, No. 3, pp. 209–226, (Sep. 1977).

Friedman, J.H., "Fitting Functions To Noisy Data In High Dimensions", Department of Statistics– Stanford University Technical Report No. 101, (Aug. 1988).

Gallop, M. A. et al., "Applications of Combinatorial Technologies to Drug Discovery, 1. Background and Peptide Combinatorial Libraries", *Journal of Medicinal Chemistry*, American Chemical Society, vol. 37, No. 9, pp. 1233–1251, (Apr. 29, 1994).

Geysen, H.M. and Mason, T.J., "Screening Chemically Synthesized Peptide Libraries for Biologically–Relevant Molecules," *Biorganic & Medicinal Chemistry Letters*, Pergamon Press, vol. 3, No. 3, 1993, pp. 397–404.

Ghose, A. K. and Gordon M. Crippen, "Use of Physicochemical Parameters in Distance Geometry and Related Three–Dimensional Qantitative Structure–Activity Relationships: A Demonstration Using *Escherichia coli* Dihydrofolate Reductase Inhibitors", *Journal of Medicinal Chemistry*, American Chemical Society, vol. 28, No. 3, pp. 333–346, (1985).

Good, A. C. et al., "Structure–Activity Relationships from Molecular Similarity Matrices", *Journal of Medicinal Chemistry*, American Chemical Society, vol. 36, No. 4, pp. 433–438, (Feb. 19, 1993).

Gordon, E. M., "Applications of Combinatorial Technologies to Drug Discovery. 2. Combinatorial Organic Synthesis, Library Screening Strategies, and Future Directions", *Journal of Medicinal Chemistry*, American Chemical Society, vol. 37, No. 10, (May 13, 1994).

Grayhill, T.L. et al., "Enhancing the Drug Discovery Process by Integration of High–Throughput Chemistry and Structure–Based Drug Design," *Molecular Diversity and Combinatorial Chemistry: Libraries and Drug Discovery*, American Chemical Society, Chaiken and Janda (eds.), American Chemical Society, 1996, pp. 16–27.

Hartigan, J. A., "Representation of Similarity Matrices By Trees", *Journal of the American Statistical Association*, vol. 62, No. 320, pp. 1140–1158, (Dec., 1967).

Hopfinger, A. J., "A QSAR Investigation of Dihydrofolate Reductase Inhibition by Baker Triazines based upon Molecular Shape Analysis", *Journal of the American Chemical Society*, American Chemical Society, vol. 102, No. 24, pp. 7196–7206, (Nov. 19, 1980).

Houghten, R.A. et al., "The Use of Synthetic Peptide Combinatorial Libraries for the Identification of Bioactive Peptides," *Peptide Research*, vol. 5, No. 6, 1992, pp. 351–358.

Jackson, R. C., "Update on computer–aided drug design", *Current Opinion in BIOTECHNOLOGY*, Current Biology, Ltd., vol. 6, No. 6, pp. 646–651, (Dec., 1995).

Kim, K. H., "Comparative molecular field analysis (CoFMA)", Molecular Similarity in Drug Design, ed. P. M. Dean, Blackie Academic & Professional, 1995, Ch. 12 (pp. 291–324).

Kohonen, T., "Self–Organized Formation of Topologically Correct Feature Maps", *Biological Cybernetics*, Springer–Verlag, vol. 43, pp. 59–69, (1982).

Koile, K. and Richard Shapiro, "Building A Collaborative Drug Design System", *Proceedings of the 25h Hawaii International Conference on System Sciences*, IEEE, pp. 706–716, (1992).

Kowalski, B. R. and C. F. Bender, "Pattern Recognition. II. Linear and Nonlinear Methods for Displaying Chemical Data", *Journal of the American Chemical Society*, American Chemical Society, pp. 686–693, (Feb. 7, 1973).

Kruskal, J. B., "Nonmetric Multidimensional Scaling: A Numerical Method", *Psychometrika*, vol. 29, No. 2, pp. 115–129, (Jun., 1964).

Lengauer, T. and Matthias Rarey, "Computational methods for biomolecular docking", *Current Opinion in Structural Biology*, vol. 6, No. 3, pp. 402–406, (Jun., 1996).

Loew, G.H. et al., "Strategies for Indirect Computer–Aided Drug Design," *Pharmaceutical Research*, Plenum Publishing Corporation, vol. 10, No. 4, 1993, pp. 475–486.

Luke, B. T., "Evolutionary Programming Applied to the Development of Quantitative Structure–Activity Relationships and Quantitative Structure–Property Relationships", *Journal of Chemical Information and Computer Sciences*, American Chemical Society, vol. 34, pp. 1279–1287, (Nov./Dec., 1994).

Lynch, M.F. et al., "Generic Structure Storage and Retrieval," *J. Chem. Inf. Comput. Sci.*, American Chemical Society, vol. 25, No. 3, Aug. 1985, pp. 264–270.

Martin, E. J. et al., "Does Combinatorial Chemistry Obviate Compuer–Aided Drug Design?", *Reviews in Computational Chemistry*, VCH Publishers, Inc., vol. 10, pp. 75–99, (1997).

Martin, E. J. et al., "Measuring Diversity: Experimental Design of Combinatorial Libraries for Drug Discovery", *Journal of Medicinal Chemistry*, American Chemical Society, vol. 38, No. 9, pp. 1431–1436, (Apr. 28, 1995).

McMartin, C. and Regine S. Bohacek, "QXP: Powerful, rapid computer algorithms for structure–based drug design", *Journal of Computer–Aided Molecular Design*, Kluwer Academic Publishers, vol. 11, pp. 333–344, (1997).

Mezey, P. G. and P. Duane Walker, "Fuzzy molecular fragments in drug research", *Drug Discovery Today*, Elsevier Science Ltd., vol. 2, No. 4, (Apr., 1997).

Müller, K., "On the paradigm shift from rational to random design", *Journal of Molecular Structure (Theochem)398–399*, Special Issue, Elsevier Science B.V., pp. 467–471, (1997).

Myers, P.L. et al., "Rapid, Reliable Drug Discovery," *Today's Chemist At Work*, American Chemical Society, Jul./Aug. 1997, pp. 46–48, 51 & 53.

Omohundro, S. M., "Bumptrees for Efficient Function, Constraint, and Classification Learning", International Computer Science Institute, pp. 693–699, Source and Date unknown.

Pabo et al., "Computer–Aided Model Building Strategies for Protein Design," *Biochemistry*, American Chemical Society, vol. 25, No. 20, 1986, pp. 5987–5991.

Parrill, A. L., "Evolutionary and genetic methods in drug design", *Drug Discovery Today*, Elsevier Science Ltd., vol. 1, No. 12, pp. 514–521, (Dec., 1996).

Polanski, J., "A neural network for the simulation of biological systems", *Journal of Molecular Structure (Theochem)398–399*, Special Issue, Elsevier Sciences B.V., pp. 565–571, (1997).

Ramos–Nino, M. E. et al., "A comparison of quantitative structure–activity relationships for the effect of benzoic and cinnamic acids on *Listeria monocytogenes* using multiple linear regression, artificial neural network and fuzzy systems", *Journal of Applied Microbiology*, The Society for Applied Bacteriology, vol. 82, No. 2, pp. 168–175, (Feb., 1997).

Rogers, D. and A. J. Hopfinger, "Application of Genetic Function Approximation to Quantitative Structure–Activity Relationships and Quantitative Structure–Property Relationships", *Journal of Chemical Information and Computer Sciences*, American Chemical Society, vol. 34, No. 4, pp. 854–866, (Jul./Aug., 1994).

Sammon, J. W., Jr. "A Nonlinear Mapping for Data Structure Analysis", *IEEE Transactions on Computers*, vol. C–18, No. 5, pp. 401–409, (May, 1969).

Saudek et al., "Solution Conformation of Endothelin–1 by H NMR, CD, and Molecular Modeling," *International Journal of Peptide Protein Research*, Munksgaard International Publishers Ltd., vol. 37, No. 3, 1991, pp. 174–179.

Simon, Z. et al., "Mapping of Dihydrofolate–reductase Receptor Site by Correlation with Minimal Topological (Steric) Differences", *Journal of Theoretical Biology*, Academic Press, vol. 66, No. 3, pp. 485–495, (Jun. 7, 1997).

Singh, J. et al., "Application of Genetic Algorithms to Combinatorial Synthesis: A Computational Approach to Lead Identification and Lead Optimization," *J. Am. Chem. Soc.*, American Chemical Society, vol. 118, No. 7, Feb. 21, 1996, pp. 1669–1676.

Smellie, A. S. et al., "Fast Drug–Receptor Mapping by Site–Directed Distances: A Novel Method of Predicting New Pharmacological Leads", *Journal of Chemical Information and Computer Sciences*, American Chemical Society, vol. 31, No. 3, pp. 386–392, (Aug., 1991).

Specht, D. F., "A General Regression Neural Network", *IEEE Transactions on Neural Networks*, The IEEE Neural Networks Council, vol. 2, No. 6, pp. 568–576, (Nov., 1991).

Svozil, D. et al., "Neural Network Prediction of the Solvatochromic Polarity/Polarizability Parameter $\pi^H_2$,", *Journal of Chemical Information and Computer Sciences*, American Chemical Society, vol. 37, No. 2, (1997).

Todorov, N. P. and P. M. Dean, "Evaluation of a method for controlling molecular scaffold diversity in de novo ligand design",*Journal of Computer–Aided Molecular Design*, ESCOM Science Publishers B.V., vol. 11, pp. 175–192, (1997).

Torgerson, W. S., "Multidimensional Scaling: I. Theory and Method", *Psychometrika*, vol. 17, No. 4, pp. 401–419, (Dec., 1952).

Van Drie, J.H. and Lajiness, M.S., "Approaches to virtual library design," *Drug Discovery today*, Elsevier Science Ltd., vol. 3, No. 6, Jun. 1998, pp. 274–283.

Vapnik, V. and L. Bottou, "Local Algorithms for Pattern Recognition and Dependencies Estimation", *Neural Computation*, Massachusets Institute of Technology, vol. 5, No. 6, pp. 893–909, (Nov., 1993).

Vapnik, V., "Principles of Risk Minimization for Learning Theory", *Advances in Neural Information Processing Systems 4*, Morgan Kaufmann Publishers, Inc., pp. 831–838, Date unknown.

Viswanadhan, V. N. et al., "Mapping the binding site of the nucleoside transporter protein: a 3D–QSAR study", *Biochimica et Biophysica Acta*, Elsevier Science Publishers B.V., vol. 1039, No. 3, pp. 356–366, (1990).

Walters, W.P. et al., "Virtual screening—an overview," *Drug Discovery today*, Elsevier Science Ltd., Elsevier Science Ltd., vol. 3, No. 4, Apr. 1998, pp. 160–178.

Weber, L. et al., "Optimization of the Biological Activity of Combinatorial Compound Libraries by a Genetic Algorithm," *Angewandte Chemie International Edition in English*, VCH, vol. 34, No. 20, 1995, pp. 2280–2282.

Westhead, D. R. et al., "A comparison of heuristic search algorithms for molecular docking", *Journal of Compuer–Aided Molecular Design*, Kluwer Academic Publishers, vol. 11, pp. 209–228, (1997).

Willett, P., "Genetic algorithms in molecular recognition and design", *Trends in Biotechnology*, Elsevier Science Ltd., vol., 13, No. 12, pp. 516–521, (Dec., 1995).

Willett, P. and Vivienne Winterman, "A Comparison of Some Measures for the Determination of Inter–Molecular Structural Similarity Measures of Inter–Molecular Structural Similarity", *Quantitative Structure–Activity Relationships*, VCH, vol. 5, No. 1, pp. 18–25, (Mar., 1986).

Zadeh, L. A., "Communication Fuzzy Algorithms", *Information and Control*, Academic Press, vol. 12, No. 2, pp. 94–102, (Feb., 1968).

Zadeh, L. A., "Fuzzy Sets", *Information and Control*, Academic Press, vol. 8, No. 3, pp. 338–353, (Jun., 1965).

Bellman, R.E.,*Adaptive Control Processes*, Princeton Univ. Press, Princeton, NJ (1961).

Bezdek, J.C., *Pattern Recognition with Fuzzy Objective Function Algorithms*, Plenum Press, New York, NY (1981).

Johnson, M.A., and Maggiora, G.M., *Concepts and Applications of Molecular Similarity*, John Wiley and Sons, New York, NY (1998).

Kohonen, T., *Self–Organizing Maps*, Springer–Verlag, Heidelberg (1996).

Oja, E., *Subspace Methods of Pattern Recognition*, Research Studies Press, Letchworth, England (1983).

Agrafiotis, D.K., "A New Method For Analyzing Protein Sequence Relationships Based On Sammon Maps," *Protein Science*, vol. 6, No. 2, Cambridge University Press, Feb. 1997, pp. 287–293.

Agrafiotis, D.K. et al., "Advances in Diversity Profiling and Combinatorial Series Design," *Molecular Diversity*, vol. 4, Kluwer Academic Publishers, 1999, pp. 1–22.

Agrafiotis, D.K. and Lobanov, V.S., "An Efficient Implementation of Distance–Based Diversity Measures Based on k–d Trees," *J. Chem. Inf. Comput. Sci.*, vol. 39, No. 1, American Chemical Society, Jan./Feb. 1999, pp. 51–58.

Agrafiotis, D.K. and Lobanov, V.S., "Bridging The Gap Between Diversity And QSAR," *Abstracts of Papers Part 1: 215th ACS National Meeting*, Mar. 29–Apr. 2, 1998, American Chemical Society, Dallas, Texas, p. 181–COMP.

Agrafiotis, D.K. and Jaeger, E.P., "Directed Diversity®: An Operating System For Combinatorial Chemistry," *Abstracts of Papers Part 1: 211th ACS National Meeting*, American Chemical Society, Mar. 24–28, 1996, New Orleans, Louisiana, p. 046–COMP.

Agrafiotis, D.K., "Diversity of Chemical Libraries," *Encyclopedia of Computational Chemistry*, vol. 1:A–D, John Wiley & Sons, New York, New York, 1998, pp. 742–761.

Agrafiotis, D.K., "On the Use of Information Theory for Assessing Molecular Diversity," *J. Chem. Inf. Comput. Sci.*, vol. 37, No. 3, American Chemical Society, May/Jun. 1997, pp. 576–580.

Agrafiotis, D.K. et al., "Parallel QSAR," *Abstracts of Papers Part 1: 217th ACS National Meeting*, Mar. 21–25, 1999, American Chemical Society, Anaheim, California, p. 050–COMP.

Agrafiotis, D.K. et al., "PRODEN: A New Program for Calculating Integrated Projected Populations," *Journal of Computational Chemistry*, vol. 11, No. 9, John Wiley & Sons, New York, New York, Oct. 1990, pp. 1101–1110.

Agrafiotis, D.K. and Jaeger, E.P., "Stochastic Algorithms for Exploring Molecular Diversity," *Abstracts of Papers Part 1: 213th ACS National Meeting*, Apr. 13–17, 1997, American Chemical Society, San Francisco, California, p. 016–CINF.

Agrafiotis, D., "Theoretical Aspects of the Complex: Arts and New Technologies," *Applications and Impacts Information Processing '94*, Proceedings of the IFIP 13th World Computer Congress, vol. II, 1994, IFIP, Hamburg, Germany, pp. 714–719.

Biswas, G. et al, "Evaluation of Projection Algorithms," *IEEE Transactions On Pattern Analysis And Machine Intelligence*, vol. PAMI–3, No. 6, IEEE, Inc., Nov. 1981, pp. 701–708.

Bonchev, D. and Trinajstić, N., "Information Theory, Distance Matrix, and Molecular Branching," *The Journal of Chemical Physics*. vol. 67, No. 10, American Institute of Physics, Nov. 15, 1977, pp. 4517–4533, (Missing pp. 4518–4519).

Borg, I. and Groenen, P. *Modern Multidimensional Scaling Theory and Applications*, Springer Series in Statistics, Springer, New York, New York, 1997, entire book submitted.

Chang, C.L. and Lee, R.C.T., "A Heuristic Relaxation Method for Nonlinear Mapping in Cluster Analysis," *IEEE Transactions on Systems, Man, and Cybernetics*, vol. SMC–3, IEEE, Inc., New York, New York, Mar. 1973, pp. 197–200.

Cramer, R.D. et al, "Virtual Compound Libraries: A New Approach to Decision Making in Molecular Discovery Research," *J. Chem. Inf. Comput. Sci.*, vol. 38, No. 6, American Chemical Society, Nov./Dec. 1998, pp. 1010–1023.

DeMers, D. and Cottrell, G., "Non–Linear Dimensionality Reduction," *Advances in Neural Information Processing Systems*, vol. 5, 1993, pp. 580–587.

Frey, P.W. and Slate, D.J., "Letter Recognition Using Holland–Style Adaptive Classifiers," *Machine Learning*, vol. 6, Kluwer Academic Publishers, Boston, Massachusetts, 1991, pp. 161–182.

Friedman, J.H., "Exploratory Projection Pursuit," *Journal of the American Statistical Association*, vol. 82, No. 397, American Statistical Association, Washington, D.C., Mar. 1987, pp. 249–266.

Friedman, J.H. and Tukey, J.W., "A Projection Pursuit Algorithm for Exploratory Data Analysis," *IEEE Transactions on Computers*, vol. C–23, No. 9, IEEE Computer Society Publications, Sep. 1974, pp. 881–889.

Garrido, L. et al., "Use of Multilayer Feedforward Neural Nets As A Display Method for Multidimensional Distributions," *International Journal of Neural Systems*, vol. 6, No. 3, World Scientific Publishing Company, Singapore, Sep. 1995, pp. 273–282.

Ghose, A.K. et al., "Prediction of Hydrophobic (Lipophilic) Properties of Small Organic Molecules Using Fragmental Methods: An Analysis of ALOGP and CLOGP Methods," *J. Phys. Chem. A*, vol. 102, No. 21, American Chemical Society, Washington, D.C., May 21, 1998, pp. 3762–3772.

Hall, L.H. and Kier, L.B., "The Molecular Connectivity Chi Indexes and Kappa Shape Indexes in Structure–Property Modeling," *Reviews in Computational Chemistry: Advances*, VCH Publishers, Inc., New York, New York, 1991, pp. 367–422.

Hecht–Nielsen, R., "Replicator Neural Networks for Universal Optimal Source Coding," *Science*, vol. 269, American Association for the Advancement of Science, Washington, D.C., Sep. 29, 1995, pp. 1860–1863.

Hotelling, H., "Analysis of a Complex of Statistical Variables into Principal Components," *The Journal of Educational Psychology*, vol. XXIV, No. 6, Warwick and York, Inc., Baltimore, Maryland, Sep. 1933, pp. 417–441.

Hotelling, H., "Analysis of a Complex of Statistical Variables into Principal Components," *The Journal of Educational Psychology*, vol. XXIV, No. 7, Warwick and York, Inc., Baltimore, Maryland, Oct. 1933, pp. 498–520.

Lee, R.C.T. et al., "A Triangulation Method for the Sequential Mapping of Points from N–Space to Two–Space," *IEEE Transactions on Computers*, IEEE Computer Society Publications, New York, New York, Mar. 1977, pp. 288–292.

Lipinski, C.A. et al., "Experimental and Computational Approaches to Estimate Solubility and Permeability in Drug Discovery and Development Settings," *Advanced Drug Delivery Reviews*, vol. 23, Elsevier Science B.V., 1997, pp. 3–25.

Lobanov, V.S. and Agrafiotis, D.K., "Intelligent Database Mining Techniques," *Abstracts of Papers Part 1: 215th ACS National Meeting*, Mar. 29–Apr. 2, 1998, American Chemical Society, Dallas, Texas, p. 019–COMP.

Lobanov, V.S. et al., "Rational Selections from Virtual Libraries," *Abstracts of Papers Part 1: 217th ACS National Meeting*, Mar. 21–25, 1999, American Chemical Society, Anaheim, California, p. 181–COMP.

Mao, J. and Jain, A.K., "Artificial Neural Networks for Feature Extraction and Multivariate Data Projection," *IEEE Transactions on Neural Networks*, vol. 6, No. 2, IEEE, Inc., New York, New York, Mar. 1995, pp. 296–317.

Oja, E., "Principal Components, Minor Components, and Linear Neural Networks," *Neural Networks*, vol. 5, No. 6, Pergamon Press Ltd., New York, New York, Nov.–Dec. 1992, pp. 927–935.

Patterson, D.E. et al., "Neighborhood Behavior: A Useful Concept for Validation of 'Molecular Diversity' Descriptors," *Journal of Medicinal Chemistry*, vol. 39, No. 16, American Chemical Society, Aug. 2, 1996, pp. 3049–3059.

Thompson, L.A. and Ellman, J.A., "Synthesis and Applications of Small Molecule Libraries," *Chemical Reviews*, vol. 96, No. 1, American Chemical Society, Jan./Feb. 1996, pp. 555–600. (Missing pp. 586–587).

Barnard, J.M. and Downs, G.M., "Computer Representation and Manipulation of Combinatorial Libraries," *Perspectives in Drug Discovery and Design—Computational Methods for the Analysis of Molecular Diversity*, vol. 7/8, Kluwer Academic Publishers, 1997, pp. 13–30.

Brint, A.T. and Willett, P. "Upperbound Procedures for the Identification of Similar Three–Dimensional Chemical Structures," *Journal of Computer–Aided Molecular Design*, vol. 2, No. 4, ESCOM Science Publishers B.V., Jan. 1989, pp. 311–320.

Brown, R.D. and Martin, Y.C., "Designing Combinatorial Library Mixtures Using a Genetic Algorithm," *Journal of Medicinal Chemistry*, vol. 40, No. 15, American Chemical Society, 1997, pp. 2304–2313.

Gasteiger, J. et al., "Analysis of the Reactivity of Single Bonds in Aliphatic Molecules by Statistical and Pattern Recognition Methods," *J. Chem. Inf. Comput. Sci.*, vol. 33, No. 3, American Chemical Society, 1993, pp. 385–394.

Gillet, V.J. et al., "The Effectiveness of Reactant Pools for Generating Structurally–Diverse Combinatorial Libraries," *J. Chem. Inf. Comput. Sci.*, vol. 37, No. 4, American Chemical Society, 1997, pp. 731–740.

Gillet, V.J. et al., "Selecting Combinatorial Libraries to Optimize Diversity and Physical Properties," *J. Chem. Inf. Comput. Sci.*, vol. 39, No. 1, American Chemical Society, 1999, pp. 169–177.

Guez, A. and Nevo, I., "Neural Networks and Fuzzy Logic in Clinical Laboratory Computing with Application to Integrated Monitoring," *Clinical Chimica Acta*, 248, Elsevier Science B.V., 1996, pp. 73–90.

Kearsley, Simon K. et al., "Chemical Similarity Using Physiochemical Property Descriptors," *J. Chem. Inf. Comput. Sci.*, vol. 36, No. 1, American Chemical Society, 1996, pp. 118–127.

Leland, B.A. et al., "Managing the Combinatorial Explosion," *J. Chem. Inf. Comput. Sci.*, vol. 37, No. 1, American Chemical Society, 1997, pp. 62–70.

Lewis, R.A. et al., "Similarity Measures for Rational Set Selection and Analysis of Combinatorial Libraries: The Diverse Property–Derived (DPD) Approach," *J. Chem. Inf. Comput. Sci.*, vol. 37, No. 3, American Chemical Society, 1997, pp. 599–614.

Martin, E.J. and Critchlow, R.E., "Beyond Mere Diversity: Tailoring Combinatorial Libraries for Drug Discovery," *Journal of Combinatorial Chemistry*, vol. 1, No. 1, American Chemical Society, Jan. 1999, pp. 32–45.

Sen, K. (ed.), *Molecular Similarity I*, Springer–Verlag, Berlin, Germany, 1995, pp. 1–30.

Sheridan, R.P. et al., "Chemical Similarity Using Geometric Atom Pair Descriptors," *J. Chem. Inf. Comput. Sci.*, vol. 36, No. 1, American Chemical Society, 1996, pp. 128–136.

Willett, P. et al., "Chemical Similarity Searching," *J. Chem. Inf. Comput. Sci.*, American Chemical Society, vol. 38, No. 6, 1998, pp. 983–996.

Agrafiotis, D.K. and Lobanov, V.S., "Ultrafast Algorithm for Designing Focused Combinational Arrays," *J. Chem. Inf. Comput. Sci.*, vol. 40, No. 4, American Chemical Society, Jun. 16, 2000, pp. 1030–1038.

Ajay, W.P.W. and Murcko, M.A., "Can We Learn to Distinguish between 'Drug–Like' and 'Nondrug–like' Molecules?," *J. Med. Chem.*, vol. 41, No. 18, Jul. 23, 1998, American Chemical Society, pp. 3314–3324.

Brown, R.D. and Martin, Y.C., "Designing Combinatorial Library Mixtures Using a Genetic Algorithm," *J. Med. Chem.*, vol. 40, No. 15, American Chemical Society, 1997, pp. 2304–2313.

Brown, R.D. and Martin, Y.C., "The Information Content of 2D and 3D Structural Descriptors Relevant to Ligand–Receptor Binding," *J. Chem. Inf. Comput. Sci.*, vol. 37, No. 1, American Chemical Society, 1997, pp. 1–9.

Brown, R.D. and Martin, Y.C., "Use of Structure–Activity Data To Compare Structure–Based Clustering Methods and Description for Use in Compound Selection," *J. Chem. Inf. Comput. Sci.*, vol. 36, No. 3, American Chemical Society, 1996, pp. 572–584.

Cummins, D.J. et al., "Molecular Diversity in Chemical Databases: Comparison of Medicinal Chemistry Knowledge Bases and Databases of Commercially Available Compounds," *J. Chem. Inf. Comput. Sci.*, vol. 36, No. 4, American Chemical Society, 1996, pp. 750–763.

*Daylight Theory: Fingerprints—Screening and Similarity, Chapter 6*, (visited Sep. 26, 2000) <http://www.daylight.com/dayhtml/doc/theory/theory.finger.html>, 8 pages.

*Daylight Theory: SMARTS* (visited Sep. 26, 2000) <http://www.daylight.com/dayhtml/doc/theory/theory.smarts.html>, 10 pages.

Downs, G.M. and Barnard, J.M., "Techniques for Generating Descriptive Fingerprints in Combinatorial Libraries," *J. Chem. Inf. Comput. Sci.*, vol. 37, No. 1, American Chemical Society, 1997, pp. 59–61.

Gillet, V.J., "Background Theory of Molecular Diversity," *Molecular Diversity in Drug Design*, Kluwer Academic Publishers, Dordrecht, Netherlands, 1999, pp. 43–65.

Good, A.C. and Lewis, R.A., "New Methodology for Profiling Combinatorial Libraries and Screening Sets: Cleaning Up the Design Process with HARPick," *J. Med. Chem.*, vol. 40, No. 2, American Chemical Society, 1997, pp. 3926–3936.

Gorse, D. and Lahana, R., "Functional Diversity of Compound Libraries," *Current Opinion in Chemical Biology*, vol. 4, Elsevier Science Ltd., 2000, pp. 287–294.

Jamois, E.A. et al., "Evaluation of Reagent–Based and Product–Based Strategies in the Design of Combinatorial Library Subsets," *J. Chem. Inf. Comput. Sci.*, vol. 40, No. 1, American Chemical Society, 2000 (pub'd on Web Dec. 9, 1999), pp. 63–70.

Leach, A. R. et al., "Implementation of a System for Reagent Selection and Library Enumeration, Profiling, and Design," *J. Chem. Inf. Comput. Sci.*, vol. 39, No. 6, American Chemical Society, 1999 (pub'd on Web Oct. 29, 1999), pp. 1161–1172.

Leach, A. R. and Hann, M. M., "The in silico World of Virtual Libraries," *Drug Discovery Today*, vol. 5, No. 8, Aug. 2000, Elsevier Science Ltd., pp. 326–336.

Leland, B. A. et al., "Managing the Combinatorial Explosion," *J. Chem. Inf. Comput. Sci.*, vol. 37, No. 1, American Chemical Society, 1997, pp. 62–70.

Lobanov, V.S. and Agrafiotis, D.K., "Stochastic Similarity Selections from Large Combinatorial Libraries," *J. Chem. Inf. Comput. Sci.*, vol. 40, No. 2, American Chemical Society, 2000(pub'd on Web Jan. 21, 2000), pp. 460–470.

Matter, H. and Pötter, T. "Comparing 3D Pharmacophore Triplets and 2D Fingerprints for Selecting Diverse Compound Subsets," *J. Chem. Inf. Comput. Sci.*, vol. 39, No. 6, American Chemical Society, 1999 (pub'd on Web Oct. 29, 1999), pp. 1211–1225.

Matter, H., "Selecting Optimally Diverse Compounds from Structure Databases: A Validation Study of Two–Dimensional and Three–Dimensional Molecular Descriptors," *J. Med. Chem.*, vol. 40, No. 8, American Chemical Society, 1997, pp. 1219–1229.

Sadowski, J. and Kubinyi, H. "A Scoring Scheme for Discriminating between Drugs and Nondrugs," *J. Med. Chem.*, American Chemical Society, vol. 41, No. 18, 1998 (pub'd on Web Aug. 1, 1998), pp. 3325–3329.

Schnur, D., "Design and Diversity Analysis of Large Combinatorial Libraries Using Cell–Based Methods," *J. Chem. Inf. Comput. Sci.*, vol. 39, No. 1, American Chemical Society, 1999 (pub'd on Web Jan. 6, 1999), pp. 36–45.

Schuffenhauer, A. et al., "Similarity Searching in Files of Three–Dimensional Chemical Structures: Analysis of the BIOSTER Database Using Two–Dimensional Fingerprints and Molecular Field Descriptors," *J. Chem. Inf. Comput. Sci.*, vol. 40, No. 2, American Chemical Society, 2000 (pub'd on Web Dec. 22, 1999), pp. 295–307.

Turner, D. B. et al., "Rapid Quantification of Molecular Diversity for Selective Database Acquistion," *J. Chem. Inf. Comput. Sci.*, vol. 37, No. 1, American Chemical Society, 1997, pp. 18–22.

Wang, J. and Ramnarayan, K., "Toward Designing Drug–Like Libraries: A Novel Computational Approach for Prediction of Drug Feasibility of Compounds," *J. Comb. Chem.*, vol. 1, No. 6, American Chemical Society, 1999 (pub'd on Web Oct. 19, 1999), pp. 524–533.

Gasteiger J. et al., "Assessment of the Diversity of Combinatorial Libraries by an Encoding of Molecular Surface Properties," *Abstract of Papers, Part 1: 211th ACS National Meeting*, Mar. 24–28 1996, American Chemical Society, New Orleans Louisiana, Item 070.

Hassan, M. et al., "Optimization and Visualization of Molecular Diversity of Combinatorial Libraries," *Molecular Diversity*, vol. 2, ESCOM Science Publishers B.V., 1996, pp. 64–74.

de Ridder, D. and Duin, R.P.W., "Sammon's Mapping Using Neural Networks: A Comparison," *Pattern Recognition Letters*, vol. 18, No. 11–13, Elsevier Science B.V., 1997, pp. 1307–1316.

Kim, H. et al., "Self–Organized Distributed Networks for Learning Highly Nonlinear Mapping," *Intelligent Engineering Systems Through Artificial Neural Networks*, vol. 4, Nov. 13–16, 1994, pp. 109–114.

Pal, N.R. and Eluri, V.K., "Two Efficient Connectionist Schemes for Structure Preserving Dimensionality Reduction," *IEEE Transactions on Neural Networks*, vol. 9, No. 6, IEEE, Nov. 1998, pp. 1142–1154.

Domine, D. et al., "Non–Linear Mapping for Structure–Activity and Structure–Property Modelling," *Journal of Chemometrics*, vol. 7, No. 4, John Wiley & Sons, Ltd., Jul.–Aug. 1993, pp. 227–242.

Clark, R. et al., "Visualizing Substructural Fingerprints," *Journal of Molecular Graphics and Modelling*, vol. 18, Elsevier Science, Inc., New York, New York, Aug.–Oct., 2000, pp. 404–411.

Saund, E., "Dimensionality–Reduction Using Connectionist Networks," *IEEE Transactions on Pattern Analysis and Machine Intelligence*, vol. 11, No. 3, Mar. 1989, pp. 304–314.

\* cited by examiner

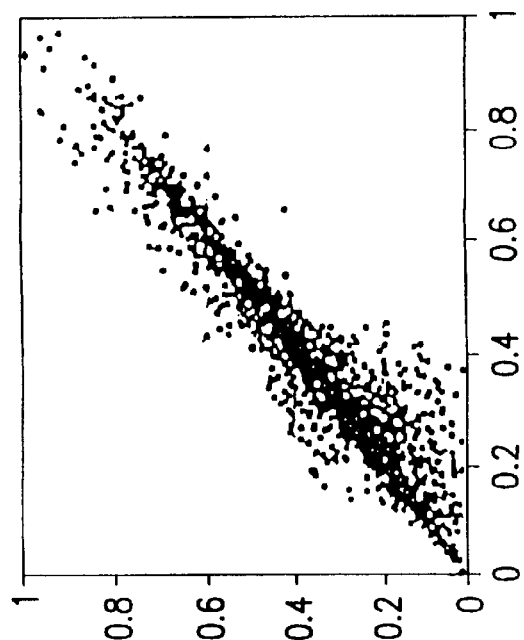
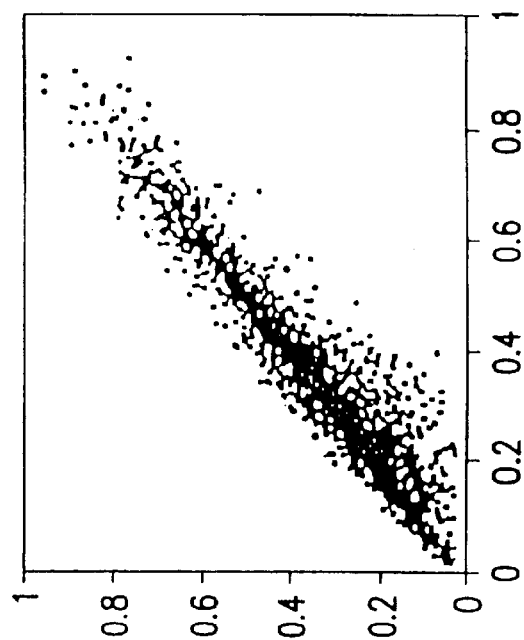
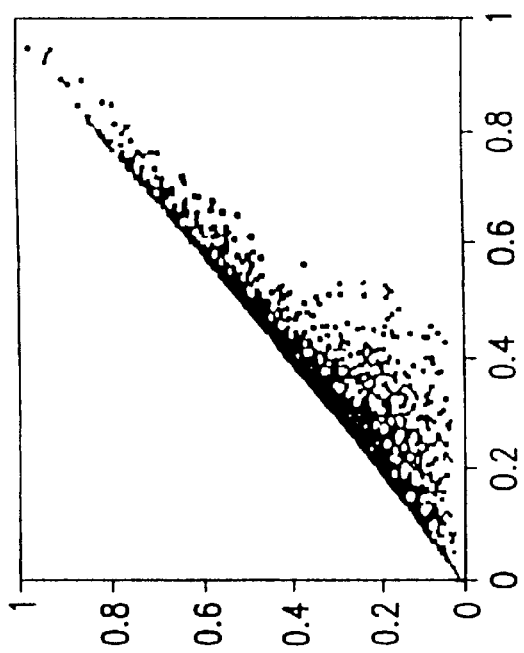

SYNTHETIC SEQUENCE FOR THE GENERATION OF THE DIAMINE LIBRARY.

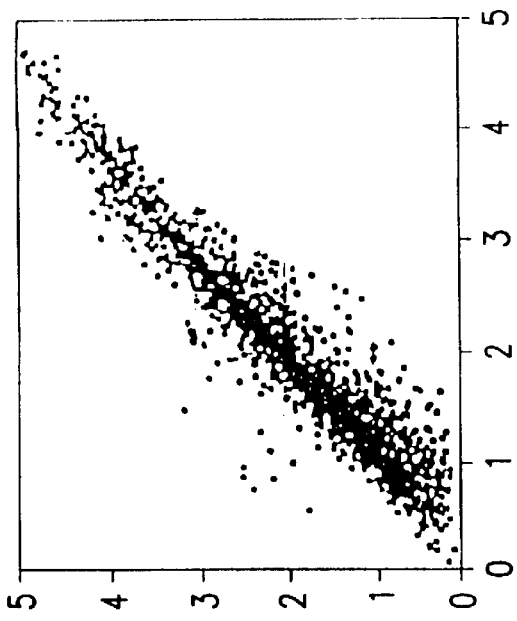
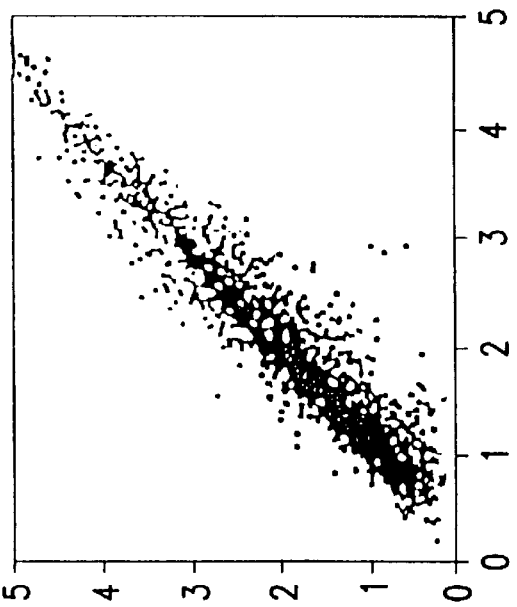
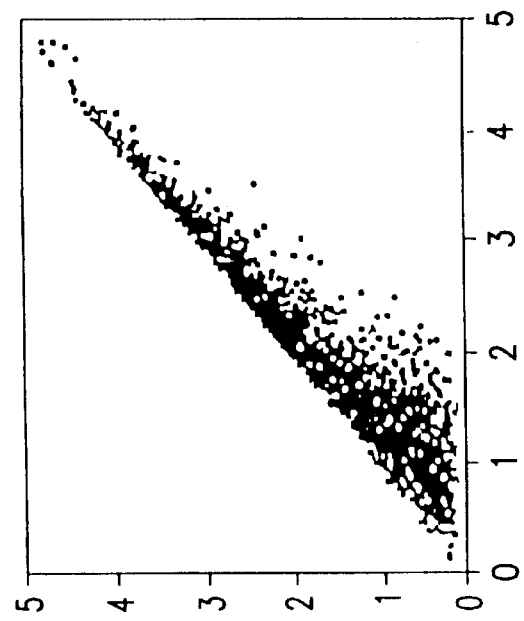

TABLE 1
PRINCIPAL COMPONENT ANALYSIS OF THE FACE, GASTEIGER AND DIAMINE DATA SETS

| PC | FACE | | GASTEIGER | | DIAMINE | |
|---|---|---|---|---|---|---|
| | VARIANCE | CUMULATIVE VARIANCE | VARIANCE | CUMULATIVE VARIANCE | VARIANCE | CUMULATIVE VARIANCE |
| 1 | 55.07 | 55.07 | 57.4214 | 57.4214 | 57.7327 | 57.7327 |
| 2 | 27.97 | 83.04 | 21.1354 | 78.5568 | 11.5729 | 69.3056 |
| 3 | 16.96 | 100.00 | 9.6095 | 88.1663 | 6.1197 | 75.4253 |
| 4 | | | 6.0305 | 94.1968 | 5.5883 | 81.0136 |
| 5 | | | 2.5848 | 96.7816 | 4.5795 | 85.5931 |
| 6 | | | 1.5980 | 98.3796 | 3.6082 | 89.2012 |
| 7 | | | 0.7007 | 99.0803 | 2.9395 | 92.1407 |
| 8 | | | 0.3754 | 99.4557 | 1.5927 | 93.7335 |
| 9 | | | 0.3096 | 99.7653 | 1.2979 | 95.0313 |
| 10 | | | 0.1386 | 99.9039 | 1.1688 | 96.2001 |
| 11 | | | 0.0719 | 99.9758 | 0.9671 | 97.1672 |
| 12 | | | 0.0242 | 100 | 0.6431 | 97.8103 |
| 13 | | | | | 0.3823 | 98.1926 |
| 14 | | | | | 0.3491 | 98.5417 |
| 15 | | | | | 0.2614 | 98.8301 |
| 16 | | | | | 0.2195 | 99.0225 |

FIG. 23

# METHOD, SYSTEM AND COMPUTER PROGRAM PRODUCT FOR NON-LINEAR MAPPING OF MULTI-DIMENSIONAL DATA

CROSS REFERENCE TO RELATED APPLICATIONS

This application is a continuation-in-part of Ser. No. 09/073,845 filed May 7, 1998 now U.S. Pat. No. 6,453,246, Sep. 17, 2002 titled, "System, Method and Computer Program Product for Representing Proximity Data in a Multi-Dimensional Space," which is a continuation-in-part of Ser. No. 08/963,872 filed Nov. 11, 1997, now U.S. Pat. No. 6,295,514, titled "System, Method and Computer Program Product for Representing Similarly/Dissimilarly Between Current Compounds" which claims priority to U.S. Provisional Patent Application Ser. No. 60/030,187, filed Nov. 4, 1996, titled "Stochastic Algorithms for Maximizing Molecular Diversity."

The above referenced applications are incorporated herein by reference in their entireties.

BACKGROUND OF THE INVENTION

1. Field of the Invention

The present invention relates to scaling of multi-dimensional data sets and, more particularly, to non-linear mapping of a sample of points from a multi-dimensional data set, determining one or more non-linear functions for the mapped sample of points, and mapping additional points using the one or more non-linear functions, including mapping members of the original multi-dimensional data set and mapping new and previously unseen points.

2. Related Art

Conventional techniques for multi-dimensional scaling do not scale well for large multi-dimensional data sets.

What is needed is a method, system, and computer program product for multi-dimensional scaling, which is fast and efficient for large multi-dimensional data sets.

SUMMARY OF THE INVENTION

A method, system and computer program product for scaling, or dimensionally reducing, multi-dimensional data sets, that scales well for large data sets. The invention scales multi-dimensional data sets by determining one or more non-linear functions between a sample of points from the multi-dimensional data set and a corresponding set of dimensionally reduced points, and thereafter using the non-linear function to non-linearly map additional points. The additional points may be members of the original multi-dimensional data set or may be new, previously unseen points. In an embodiment, the invention begins with a sample of points from an n-dimensional data set and a corresponding set of m-dimensional points. Alternatively, the invention selects a sample of points from an n-dimensional data set and non-linearly maps the sample of points to obtain the corresponding set of m-dimensional points. Any suitable non-linear mapping or multi-dimensional scaling technique can be employed. The process then trains a system (e.g., a neural network), using the corresponding sets of points. During, or at the conclusion of the training process, the system develops or determines a relationship between the two sets of points. In an embodiment, the relationship is in the form of one or more non-linear functions. The one or more non-linear functions are then implemented in a system. Thereafter, additional n-dimensional points are provided to the system, which maps the additional points using the one or more non-linear functions, which is much faster than using conventional multi-dimensional scaling techniques. In an embodiment, the determination of the non-linear relationship is performed by a self-learning system such as a neural network. The additional points are then be mapped using the self-learning system in a feed-forward manner.

BRIEF DESCRIPTION OF THE FIGURES

The present invention will be described with reference to the accompanying drawings, wherein:

FIG. 6A illustrates actual versus projected distances for the face data set using principal component analysis;

FIG. 6B illustrates actual versus projected distances for the face data set using non-linear mapping;

FIG. 6C illustrates actual versus projected distances for the face data set using neural network projection;

FIG. 13A illustrates actual versus projected distances for a principal component projection of the diamine data set;

FIG. 13B illustrates actual versus projected distances for a principal non-linear mapping of the diamine data set;

FIG. 13C illustrates actual versus projected distances for a neural network projection of the diamine data set;

FIG. 23 illustrates a table showing principal component analysis of the face, Gasteiger and diamine data sets.

In the drawings, like reference numbers indicate identical or functionally similar elements. Also, the leftmost digit(s) of the reference numbers identify the drawings in which the associated elements are first introduced.

DETAILED DESCRIPTION OF THE PREFERRED EMBODIMENTS

Table of Contents

Figure 1B:
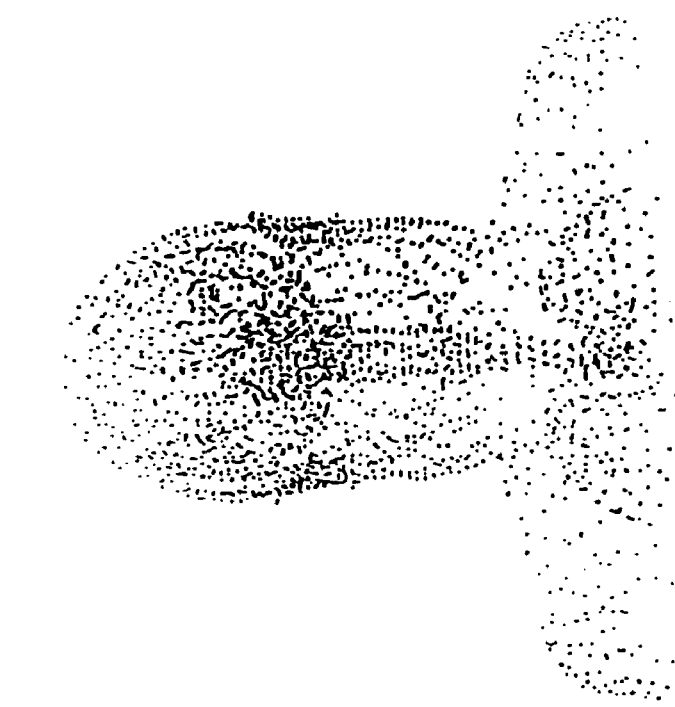
FIG. 1B illustrates a frontal view of the face data set.

I. Non-Linear Mapping Networks
  A. Introduction
  B. Dimensionality Reduction
  C. Non-Linear Mapping
  D. Non-Linear Mapping Networks
  E. Combinatorial Chemistry
II. Implementation in a Process
  A. Selecting a Sample of Points
  B. Non-Linearly Mapping the Sample of Points
  C. Determining One or More Non-Linear Functions
  D. Mapping Additional Points Using the Non-Linear Functions
III. Implementation in a System
IV. Additional Features of the Invention
  A. Multiple Non-Linear Functions
V. Implementation in a Computer Program Product
VI. Conclusions

Non-Linear Mapping Networks

A. Introduction

Among the many dimensionality reduction techniques that have appeared in the statistical literature, multi-dimensional scaling and non-linear mapping stand alone for their conceptual elegance and ability to reproduce the topology and structure of the data space in a faithful and unbiased manner. Unfortunately, all known algorithms exhibit quadratic time complexity which imposes severe limitations on the size of data sets that can be effectively analyzed using existing hardware. This specification describes a novel approach that combines "conventional" non-linear mapping techniques with feed-forward neural networks, and allows the processing of data sets orders of magnitude larger than those accessible using conventional methodologies. Rooted on the principle of probability sampling, the method employs an algorithm to multi-dimensionally scale a small random sample, and then "learns" the underlying non-linear transform using a multi-layer perceptron trained with the back-propagation algorithm. Once trained, the neural network can be used in a feed-forward manner to project new, unseen samples with minimal distortion. Using examples from the fields of combinatorial chemistry and computer vision, we demonstrate that this method can generate projections that are virtually indistinguishable from those derived by classical methodologies, and can do so at a fraction of the time required by these techniques. The ability to encode the non-linear transform in the form of a neural network opens new possibilities and makes non-linear mapping applicable in situations where its use has been hitherto unthinkable.

B. Dimensionality Reduction

Dimensionality reduction and visualization is of paramount importance in scientific data analysis. Of particular importance is the ability to understand the structure and topology of the data, and the interrelationships and associations between the subjects of our study. Such relationships are often described by means of a similarity index derived either through direct observation, or through the measurement of a set of characteristic features which are subsequently combined in some form of dissimilarity or distance measure. Indeed, distance is an ubiquitous concept, and represents one of the most reliable guiding principles for understanding our universe, one that we can comprehend, feel comfortable with, and navigate with ease and confidence.

This specification describes a new approach to an old-fashioned way of looking at high-dimensional data. High-dimensional spaces possess properties that challenge and often contradict the intuition that we have developed from our experience with 2- or 3-dimensional geometry. This complexity has often been referred to as the "curse of dimensionality", a term originally introduced by Bellman to describe the complexity of combinatorial optimization over many dimensions. (See Bellman, R. E., *Adaptive Control Processes*, Princeton University Press, 1961, incorporated herein by reference in its entirety). In statistics, this expression is used to describe the sparsity of data in higher dimensions. As the classic examples of the effect of dimensionality on the volumes of a hypersphere and a hypercube illustrate, (see for example, Wegman, E. J. *Ann. Statist.*, 1970, and Scott, D. W., *Multivariate Density Estimation. Theory, Practice and Visualization*, Wiley, N.Y., 1992, both of which are incorporated herein by reference in their entireties), most of the density of a high-dimensional space is concentrated near its boundaries, leaving the "core" virtually empty. Indeed, the concept of "neighborhoods" in higher dimensions is somewhat distorted; if the neighborhoods are "local", they are virtually empty; if they are not empty, then they are not "local". This has important consequences in many statistical applications.

Yet, high-dimensional spaces are encountered in all disciplines of science, from chemistry and physics, to social sciences and psychology. In modern science, phenomena are understood by measuring and analyzing a set of characteristic features, and by constructing models to explain their structure and causality. If the number of features is small, patterns in the data can be extracted using conventional graphical methods such as 1- and 2-dimensional histograms, scatter-plot diagrams and/or kinematic techniques. In a higher-dimensional setting, however, such techniques are of limited value since they lead to a combinatorial explosion of possibilities, and loss of potential higher-order relationships.

High-dimensional representations pose a number of additional problems. The first, and perhaps most important, is the presence of substantial correlation between the variables. The importance of correlation is domain-dependent, but in general redundant variables tend to exert undue influence in data analysis. Moreover, if the features are to be used for regression or classification, over-fitting can be a serious threat. The existence of a large number of variables can cause most regression and classification techniques to focus on the idiosyncrasies of the individual samples and lose sight of the broad picture that is essential for generalization beyond the training set. Finally, as the dimensionality of the space increases, the size of the computational effort needed to perform the analysis can be daunting even for today's most powerful computers. Fortunately, most multivariate data in $\Re$ are almost never d-dimensional. That is, the underlying structure of the data is almost always of dimensionality lower than d. In the interest of parsimony, and to simplify the analysis and representation of the data, it is often desirable to reduce the dimensionality of the space by eliminating dimensions that add very little to the overall picture. Most methods reported to date attempt to do so by projecting the original space into one or more 2- or 3-dimensional representations.

Perhaps the most common dimensionality reduction technique is principal component analysis (PCA). See for example, Cooley, W., Lohnes, P., *Multivariate Data Analysis*, Wiley, N.Y., 1971, incorporated herein by reference in it's entirety. PCA reduces a set of partially cross-correlated data into a smaller set of orthogonal variables (principal components) with minimal loss in the contribution to variation. In effect, the method detects and combines features which behave in a similar way into a new set of variables that are orthogonal, i.e. non-correlated. Principal components are computed by diagonalizing the variance-covariance matrix. The eigenvectors of this matrix are the principal components, and the eigenvalues are their respective variances. Although the number of PC's is equal to the number of input variables, if there is some redundancy in the data, it is usually sufficient to retain only the first few PC's that account for "most" of the variance in the original samples. This limit is arbitrary, and is usually determined by heuristic rules (typically, a threshold of 90 or 95% is used). The main advantage of PCA is that it makes no assumptions about the probability distributions of the original variables. The elements of each eigenvector reflect the influence of the original variables in that eigenvector, and are used to establish natural associations between variables.

Closely related to PCA is a technique known as factor analysis (FA). Factor analysis is an attempt to explain the correlations between variables in the form of underlying factors, which are themselves not directly observable, and which are thought to be representative of the underlying process that has created these correlations. On the surface, factor analysis and principal component analysis are very similar. Both rely on an eigenvalue analysis of the covariance matrix, and both use linear combinations of variables to explain a set of observations. However, in PCA the quantities of interest are the observed variables themselves; the combination of these variables is simply a means for simplifying their analysis and interpretation. Conversely, in factor analysis the observed variables are of little intrinsic value; what is of interest is the underlying factors.

Unfortunately, both PCA and FA are sensitive to outliers, missing data and poor correlations due to poorly distributed variables. More importantly, these techniques assume a linear constraint of the input space and perform poorly in high-dimensional, non-linear spaces. Finally, none of these methods guarantees to extract the most important features for the problem at hand, and there is always the possibility that some critical piece of information is left behind, buried under a pile of redundancies.

C. Non-Linear Mapping

Multi-dimensional scaling (MDS), non-linear mapping (NLM) and Kohonen networks represent alternative dimensionality reduction techniques that deal specifically with non-linear spaces. See for example: Borg, I., Groenen, P., *Modern Multidimensional Scaling*, Springer-Verlag, N.Y., 1997; Sammon, J. W. *IEEE Trans. Comp.*, 1969; and Kohonen, T. *Self-Organizing Maps*, Springer-Verlag, Heidelberg, 1996; respectively, all of which are incorporated by reference in their entirety.

The first two were designed to reproduce coordinates from a distance matrix, while the latter features data abstraction by means of prototyping, achieved though a powerful self-organizing principle. In the first two techniques, the reduction is effected by reconstructing a low-dimensional coordinate set from a distance matrix computed from a higher-dimensional representation, while in the latter the original property vectors are mapped onto a two dimensional cell array arranged in a way that preserves the topology and density of the original data set. These reduced representations can subsequently be used for a variety of pattern recognition and classification tasks.

Multi-dimensional scaling (MDS) emerged from the need to visualize a set of objects described by means of a similarity or dissimilarity matrix. The technique originated in the field of psychology and can be traced back to the work of Torgerson and Kruskal. See Torgeson, W. S., *Psychometrika*, 1952, and Kruskal, J. B. *Phychometrika*, 1964, respectively, both of which are incorporated by reference in their entirety.

The problem is to construct a configuration of points in a low-dimensional space from information about the distances between these points. In particular, given a set of k data points in the input space $\{x_i, i=1, 2, \ldots k\}$, a symmetric matrix $d_{ij}$ of the observed dissimilarities between these points, and a set of images of $x_i$ on a d-dimensional display plane $\{\xi_i, i=1, 2, \ldots, k; \xi_1 \in \Re^d\}$, the objective is to place $\xi_i$ onto the plane in such a way that their Euclidean distances $\delta_{ij}=\|\xi_i-\xi_j\|$ approximate as closely as possible the corresponding values $d_{ij}$. A sum-of-squares error function can be used to decide the quality of the embedding. The most commonly used criterion is *Kruskal's stress*:

$$S = \sqrt{\frac{\sum_{i<j}(\delta_{ij} - d_{ij})^2}{\sum_{i<j}\delta_{ij}^2}} \qquad \text{Eq. 1}$$

The actual embedding is carried out in an iterative fashion. The process starts by 1) generating an initial set of coordinates $\xi_i$, 2) computing the distances $\delta_{ij}$, 3) finding a new set of coordinates $\xi_i$ using a steepest descent algorithm such as Kruskal's linear regression or Guttman's rank-image permutation, and 4) repeating steps 2 and 3 until the change in the stress function falls below some predefined threshold.

Non-linear mapping (NLM) is a closely related technique proposed by Sammon in 1969. See for example, Sammon, J. W. *IEEE Trans. Comp.*, 1969, discussed above. Just like MDS, NLM attempts to approximate local geometric relationships on a 2- or 3-dimensional plot. Although an "exact" projection is only possible when the distance matrix is positive definite, meaningful projections can be obtained even when this criterion is not satisfied. As in MDS, the process starts with a finite set of samples $\{x_i, i=1, 2, \ldots, k\}$, a symmetric dissimilarity matrix $d_{ij}$, and a set of images of $x_i$ on a display plane $\{\xi_i, i=1, 2, \ldots k; \xi_i \in \Re^d\}$, and attempts to place $\xi_i$ onto the plane in such a way that their Euclidean distances $\delta_{ij}=\|\xi_i-\xi_j\|$ approximate as closely as possible the corresponding values $d_{ij}$. The embedding (which can only be made approximately) is carried out in an iterative fashion by minimizing an error function, E, which measures the difference between the distance matrices of the original and projected vector sets:

$$E(m) = \frac{\sum_{i<j}^{k}\frac{[d_{ij} - \delta_{ij}(m)]^2}{d_{ij}}}{\sum_{i<j}^{k} d_{ij}} \qquad \text{Eq. 2}$$

E is minimized using a steepest-descent algorithm. The initial coordinates, $\xi_i$, are determined at random or by some other projection technique such as PCA, and are updated using Eq. 3:

$$\xi_{pq}(m+1) = \xi_{pq}(m) - \lambda\Delta_{pq}(m) \qquad \text{Eq. 3}$$

where m is the iteration number and $\lambda$ is the learning rate parameter, and $$\Delta_{pq}(m) = \frac{\partial E(m)}{\partial \xi_{pq}(m)} \bigg/ \left|\frac{\partial^2 E(m)}{\partial \xi_{pq}(m)^2}\right| \qquad \text{Eq. 4}$$

The advantage of non-linear maps compared to Kohonen networks is that they provide much greater individual detail and lend themselves beautifully for interactive analysis and visual inspection. By preserving the distances of the original samples on the projected map, MDS and NLM are able to represent the topology and structural relationships in the data set in a unique and faithful manner. Although in most cases projection does lead to some loss of information, the amount of distortion induced by NLM and MDS is minimal compared to other dimensionality reduction techniques. Unfortunately, despite these advantages, all known non-linear mapping algorithms exhibit quadratic time complexity and scale adversely with the size of the data set.

This specification describes a novel approach that combines non-linear mapping techniques, such as conventional non-linear mapping techniques, with feed-forward neural networks, and allows the processing of data sets orders of magnitude larger than those accessible using conventional methodologies. The following paragraphs provide an overview of the key algorithmic details, and describe the advantages of this approach using examples from the fields of combinatorial chemistry and computer vision.

D. Non-Linear Mapping Networks

The method described herein is rooted in the principle of probability sampling, i.e. the notion that a small number of randomly chosen members of a given population will tend to have the same characteristics, and in the same proportion, with the population as a whole. Our approach is to employ an algorithm to: multi-dimensionally scale a small random sample which reflects the overall structure of the data, and then "learn" the underlying non-linear transform using a multi-layer perceptron trained with the back-propagation algorithm. See for example, Haykin, S. *Neural Networks. A Comprehensive Foundation.* Prentice-Hall, 1998.

Once trained, the neural network can be used in a feed-forward manner to project the remaining members of the population as well as new, unseen samples with minimal distortion. For a non-linear projection from n to m dimensions, a 3-layer neural network with n input and m output units is employed. The number of hidden neurons is determined empirically based on the dimensionality and structure of the input space and the size of the training set.

Figure 1A:
FIG. 1A illustrates a lateral view of a face data set.

We begin our analysis using a data set from the computer vision literature. The data set is a 3-dimensional image of a man's face comprised of 2,630 data points. The task was to project that image onto a plane and visually inspect the results. The object can be easily recognized in both its original and projected forms, and helps to illustrate the subtle differences between linear and non-linear dimensionality reduction techniques. The original data is shown in two orthogonal views in FIG. 1a and 1b, respectively. FIG. 1a is a lateral view of the face data set. FIG. 1b is a frontal view of the face data set.

Figure 2:
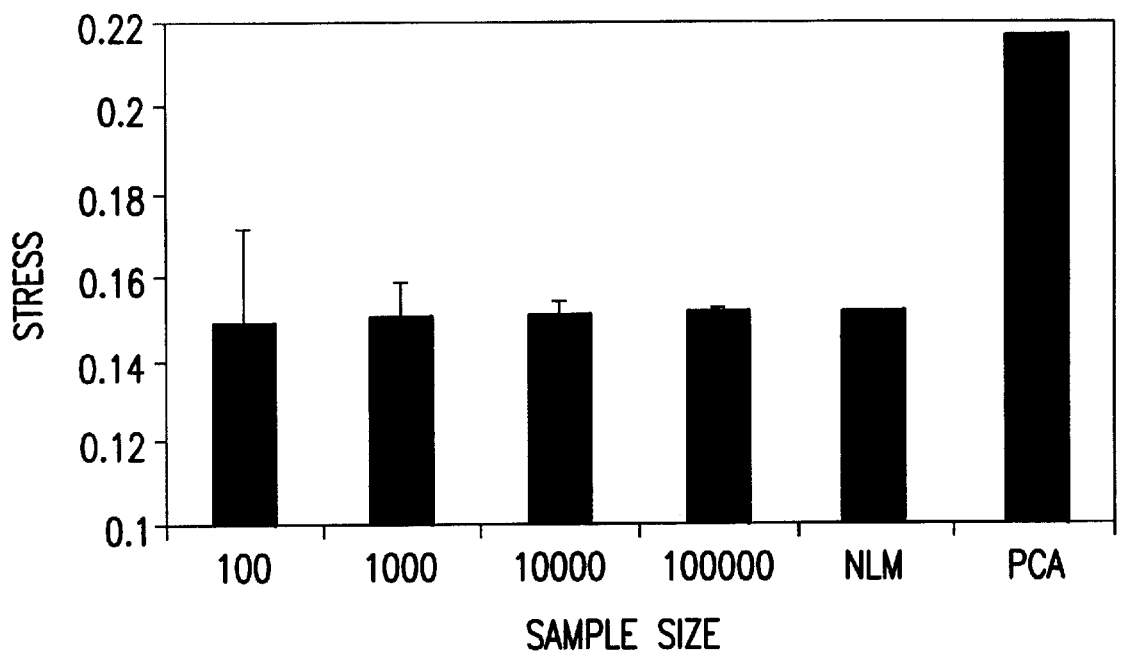
FIG. 2 illustrates stochastic stress of a non-linear map as a function of sample size for the face data set.

Let us first examine the characteristics of the Kruskal stress function which measures the quality of the fit between the distance matrices of the original and projected vector sets. As is evident from Eq. 1, this function scales to the square of the number of items in the collection, and is impossible to compute for data sets containing hundreds of thousands to millions of items. However, like many quantities of this kind, stress has well-defined statistical properties: one can obtain reliable estimates of that quantity by examining only a small fraction of the total number of pair-wise distances in the data. FIG. 2 illustrates stochastic stress of a non-linear map as a function of sample size for the face data set. The first four columns and their respective error bars represent the mean and standard deviation of the stress of the NLM projection computed using 100, 1,000, 10,000 and 100,000 randomly selected distances, respectively. The last two columns represent the true stress of the NLM and PC projections, respectively, computed by evaluating all 3,457,135 pair-wise distances. FIG. 2 shows the dependence of stress on the size of the sample used to derive it for the 2-dimensional AA non-linear map of the face data set. The numbers reported rip were derived by selecting pairs of points at random, measuring their pair-wise distances in the original and projected vector spaces, and accumulating the error in Eq. 1. For each sample size, n, 100 stress evaluations were carried out, each using a different randomly chosen set of n pair-wise distances. The mean and standard deviation of the resulting distributions are plotted in FIG. 2. It is clear that the "stochastic" stress obtained by this method shows negligible variance for all but the smallest samples, and asymptotically approaches the true stress; indeed, by sampling a mere one thousandth of the total number of distances we obtain a stress that is within 4 decimal places to the true value. This turns out to be true for every data set that we studied, regardless of dimensionality, structure and origin.

Figure 3A:
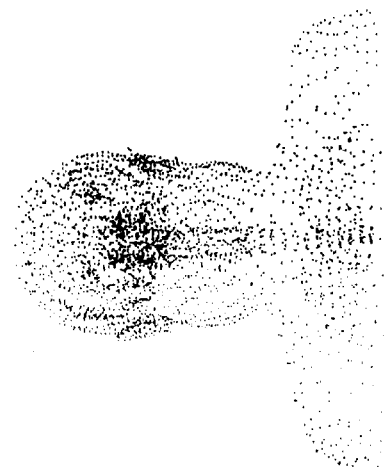
FIG. 3A illustrates a two dimensional principal component projection of the face data set.
Figure 3B:
FIG. 3B illustrates a two dimensional non-linear mapping projection of the face data set.

We now turn our attention to the effect of sampling in deriving the non-linear map itself. The 2-D PCA and NLM projections of the face data are shown in FIG. 3a and FIG. 3b, respectively. For this and all other data sets used in this study, the PCA projection was derived from the first 2 principal components that accounted for most of the variance in the data, while the non-linear map was obtained with a variant of Sammon's original algorithm developed by our group. See, for example, U.S. Patent Application Ser. No. 09/073,845, filed May 7, 1998, now U.S. Pat. No. 6,453,246 titled, "System, Method and Computer Program Product for Representing Proximity Data in a Multi-Dimensional Space," incorporated in its entirety above by reference. In general, the two projections are very similar, but differ in one important aspect: in the principal component projection, one dimension is completely suppressed and all characteristics of the man's profile are virtually lost (see FIG. 3a). In contrast, the non-linear map represents a "hybrid" view that combines important, distinctive features of the entire object. While the general shape is still dominated by the head-on view, one can clearly recognize key elements of the facial profile such as the nose, the lips and the chin, as well as a detectable protrusion in the occipotal area of the skull (FIG. 3b). In terms of distortion, NLM does a much better job in preserving the distance matrix than PCA, as manifested by a Kruskal stress of 0.152 and 0.218 for the NLM and PCA projections, respectively.

Figure 4:
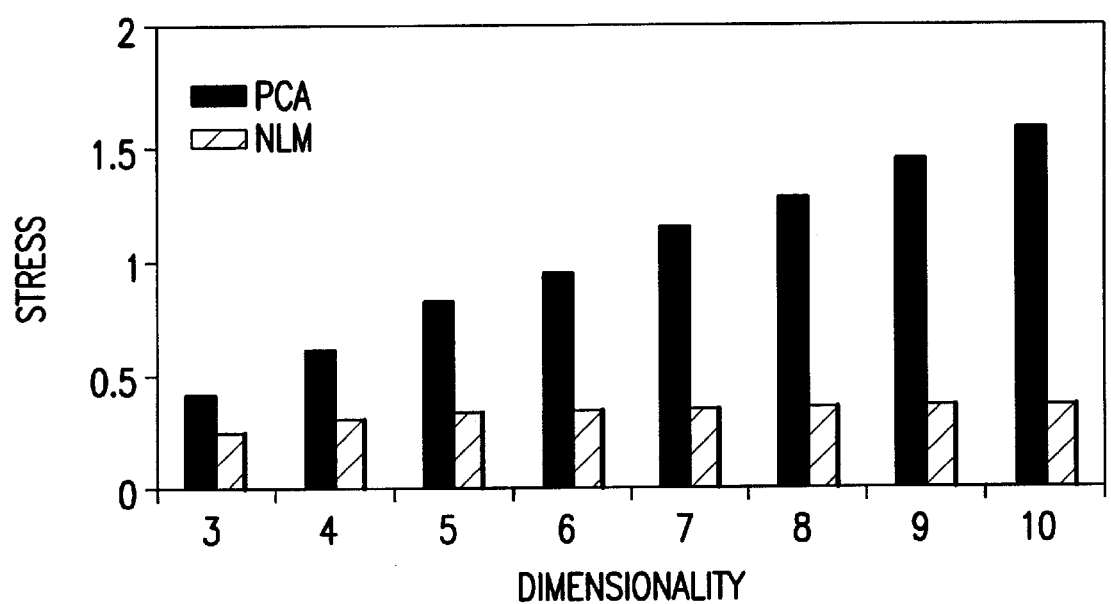
FIG. 4 illustrates a comparison of stress between principal component analysis and non-linear mapping.

The failure of linear methods to preserve distance relationships becomes more pronounced as the true dimensionality of the space increases. Consider, for example, the stress of the PCA and NLM projections of 1,000 data points uniformly distributed in the unit (hyper) cube. The results for hypercubes of 3 to 10 dimensions are illustrated in FIG. 4. While NLM appears to maintain its effectiveness in high-dimensional spaces, PCA's performance deteriorates rapidly and the method becomes virtually useless beyond a few dimensions.

The present invention captures, or determines, one or more non-linear transforms produced by the classical iterative algorithm, or equivalents thereof, in the form of an analytical function. In order to determine how many points are needed to extract such a relationship, we used a multi-layered perceptron as the non-linear mapping device, and carried out an extensive set of simulations using several sample sizes ranging from 100 to 1,600 points. The experiment consisted of the following steps. For each sample size, n, 100 different random subsets of n points were extracted from the original 3-dimensional object, and were independently mapped using our "classical" non-linear mapping algorithm. The 3 D input and 2 D output coordinates obtained from the NLM were then used to train 100 separate neural networks with 3 input, 10 hidden and 2 output neurons having logistic activation functions. All networks were trained for 10,000 epochs with a linearly decreasing learning rate from 0.5 to 0.01, and a momentum of 0.8. Once the networks were trained, the entire data set of 2,630 points was presented to each one, and 100 new sets of 2-D coordinates were obtained. As stated above, this procedure was repeated for 5 different sample sizes containing 100, 200, 400, 800 and 1,600 points, respectively. To simplify the notation, we will refer to each of these 100 subsets and all of its associated data as a separate "run".

Figure 5:
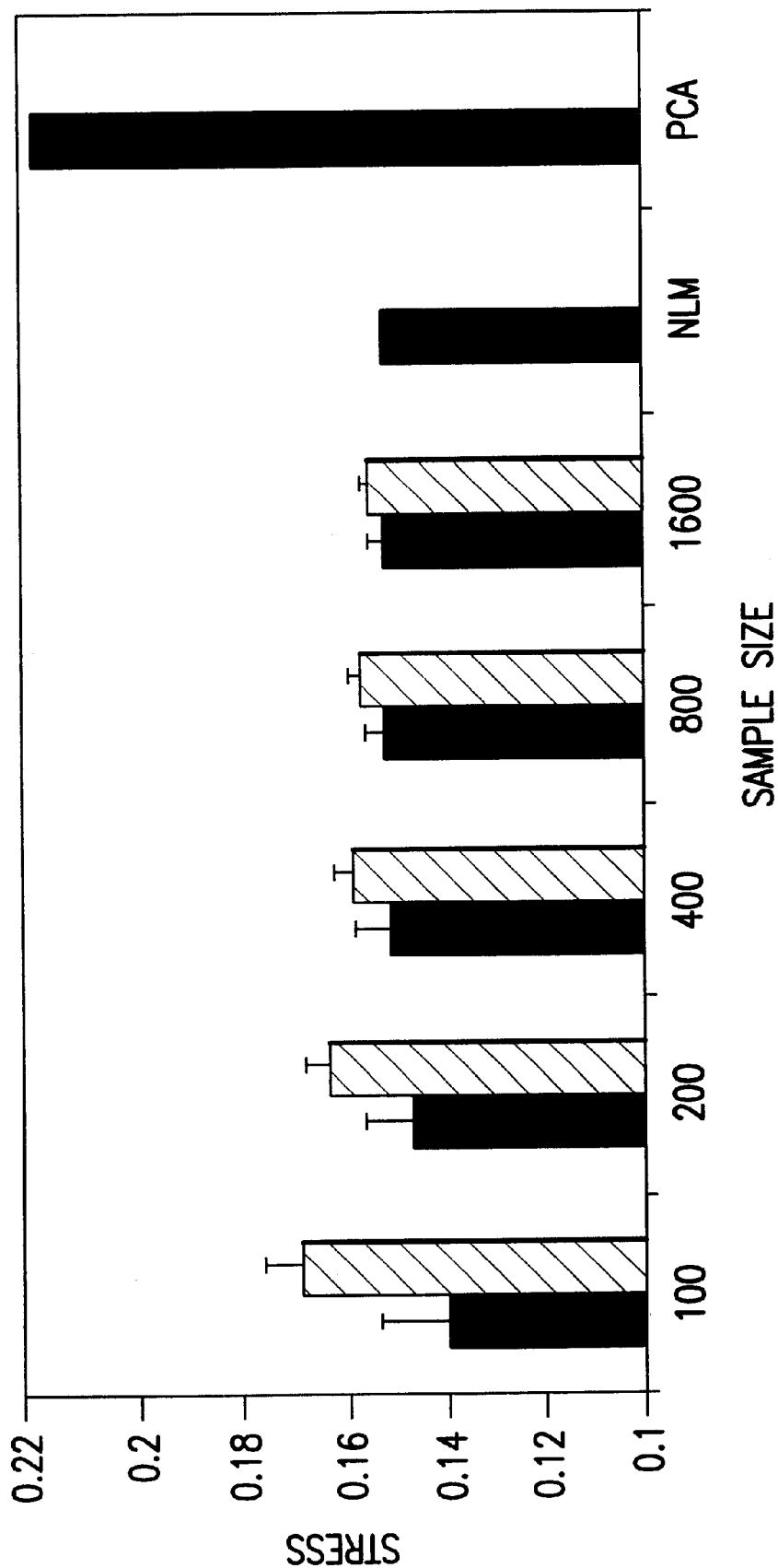
FIG. 5 illustrates a comparison of stress for projections using neural network, non-linear mapping, and principal component analysis.

The results of this experiment are summarized in FIG. 5. FIG. 5 illustrates stress as a function of sample size for the face data set. The two columns on the right represent the stress of the full NLM and PC projections, respectively, and serve as reference points to gauge the quality of the neural approximation. The five pairs of columns on the left and their respective error bars represent the mean and standard deviation of the stress of the NLM projection for the training set [(in blue)] and the neural projection for the entire data set [(in red)] for each particular sample size. These results are fully consistent with our intuition and expectations. First, the average stress of the non-linear map increases with the number of points in an asymptotic manner. The average stress of 400 points for example (15% of the entire data set) is within 0.001 units to the stress of the full NLM, with a standard deviation of only 0.006. More importantly, the stress of the corresponding neural projection exhibits a similar but opposite trend of the same asymptotic character. As one would expect, the more information is used to train the neural network, the more predictive it becomes and the better it approximates the true underlying transform. Interestingly enough, even with a mere 100 points, every single set that we tried led to a neural approximation that was better than that obtained with PCA. The most significant observation, however, is that the standard deviation of the neural stress is very small and lies well within the limits of acceptable error.

Figure 3C:
FIG. 3C illustrates a two dimensional neural network projection of the face data set.

To get a better appreciation of what the stress values really mean in the context of structure, FIG. 3c shows the non-linear map obtained from a neural network trained with an "average" 400-point sample (400-point training set) and having a stress of 0.158. The map is virtually identical to that obtained by NLM, revealing the same characteristic mix of features from the frontal and lateral views, albeit in a more "regular" form. Indeed, for the purposes of exploratory data analysis, the two images are virtually indistinguishable.

Finally, let us look at the distortion from a different perspective. FIG. 6 illustrates actual vs projected distances for the face data set. FIG. 6 shows three scatter plots obtained by selecting 1,000 pairs of points at random, and plotting their distances in the latent 2-D space against the corresponding distances in the original 3-D space. FIGS. 6a, 6b and 6c correspond to the PCA, NLM and NN projections, respectively. In the PCA plot (FIG. 6a) all distances lie below the diagonal which is consistent with the loss of dimensionality and linear nature of the transformation. However, the distortion is more pronounced in the lower left hand side of the plot, which means that short pair-wise distances are much more poorly preserved. Although distortion is also evident in the non-linear maps, the error appears to be more evenly distributed, and there is less bias against the distances in the lower end of the spectrum. This is an important difference, since we are usually much more interested in preserving the proximities of objects that are closely related to each other, as long as dissimilar objects appear to be sufficiently distant. The NLM and NN plots are, again, virtually identical, which confirms our earlier remarks regarding the quality of the neural approximation.

E. Combinatorial Chemistry

Although the face data provides a useful test case, it pales in comparison to the data sets for which this method was intended, both in terms of size and dimensionality. One area of particular interest to us, and one in which large data sets are commonplace, is combinatorial chemistry. In recent years, the pharmaceutical and chemical industry have embraced a new set of technologies that allow the simultaneous synthesis and biological evaluation of large chemical libraries containing hundreds to hundreds of thousands or even millions of molecules. See for example, Thompson, L. A., Ellman, J. A. *Chem. Rev.*, 1996, incorporated herein by reference in its entirety. Also see U.S. Pat. No. 5,463,564, incorporated by reference in its entirety.

A combinatorial library is a collection of chemical compounds derived from the systematic application of a synthetic principle to a prescribed set of building blocks. It is that very same principle that has given rise to the enormous diversity of the living world, whose proteome is comprised of a mere 20 amino-acids connected together via peptide bonds in innumerable combinations. The design and analysis of combinatorial libraries is becoming an integral part of modern drug design and involves data sets of truly staggering size. See for example:

Agrafiotis, D. K. Diversity of Chemical Libraries, in *The Encyclopedia of Computational Chemistry*, Schleyer, P. v. R., Allinger, N. L., Clark, T., Gasteiger, J., Kollman, P. A., Schaefer III, H. F., Schreiner, P. R., Eds., John Wiley & Sons, Chichester, 1998, Vol. 1, 742–761; and Agrafiotis, D. A., Myslik, J. C, Salemme, F. R., *Molecular Diversity*, 1998, 4(1), 1–22, Advances in Diversity Profiling and Combinatorial Series Design, in *Annual Reports in Combinatorial Chemistry and Molecular Diversity*, Pavia, M., Moos, W. Eds., Kluwer, 1999, 2, 71–92.

Both of the above documents are incorporated herein by reference in their entirety.

Our group was the first to demonstrate the importance of non-linear mapping in library design because of its unparalleled ability to convey complex relationships in an intuitive manner without loss of individual detail. See for example, Agrafiotis, D. K. Stochastic algorithms for maximizing molecular diversity. *J. Chem. Info. Comput. Sci.*, 1997, incorporated herein by reference in its entirety. This work followed an earlier successful application in the analysis of 390 multiply aligned protein kinase domains, using as a property vector the 339 amino-acids that comprised each of the aligned sequences. See for example, Agrafiotis, D. K. *Protein Science*, 1997, incorporated herein by reference in its entirety. Indeed, we found that the non-linear maps were able to capture the essential features of the distance matrix, and revealed clusters that were consistent with the known substrate specificities of these proteins.

Figure 7C:
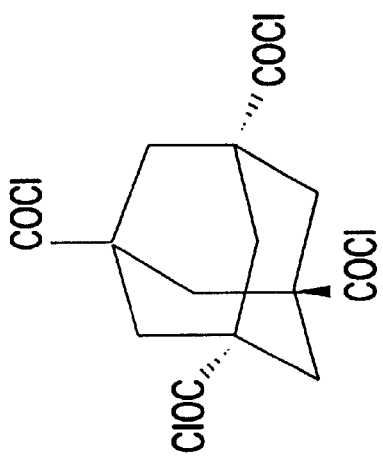
FIG. 7C illustrates combinatorial scaffolds.
Figure 7B:
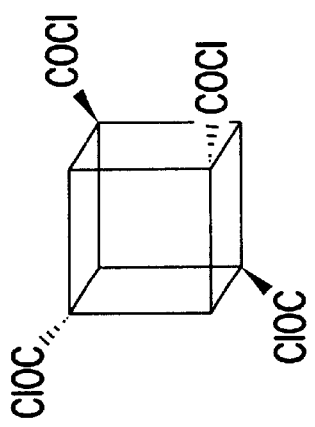
FIG. 7B illustrates combinatorial scaffolds.
Figure 7A:
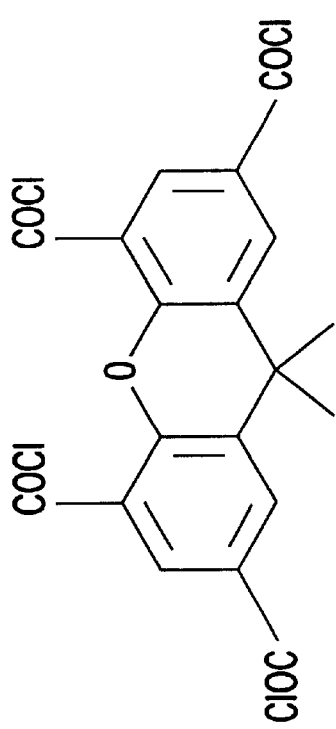
FIG. 7A illustrates combinatorial scaffolds.

The remaining paragraphs in this section describe the use of neural networks for the multi-dimensional scaling of two combinatorial libraries. The first was originally developed by Gasteiger and represents one of the first demonstrations of the importance of visualization in library design. See for example, Sadowski, J., Wagener, M.; Gasteiger, J. *Angew. Chem. Int. Ed. Engl.*, 1996, incorporated herein by reference in its entirety. The data set consists of three sub-libraries derived by condensing three rigid central scaffolds with a set of 19 L-amino-acids. These scaffolds were based on the cubane, adamantane and dimethylxanthene cores, funcionalized by four acid chloride groups (FIG. 7). FIG. 7 illustrates combinatorial scaffolds used by Sadowski, Wagener, and Gasteiger. Due to symmetry, this scheme resulted in a total of 87,723 unique compounds, or 11,191, 11,191 and 65,341 cubane (FIG. 7b), adamantine (FIG. 7c) and xanthene (FIG. 7a) derivatives, respectively.

Each compound was described by a 12-dimensional spatial auto-correlation vector, which represents the distribution of the electrostatic potential on the van der Waals surface of the molecule. This vector was derived by computing the electrostatic potential (MEP) on an evenly distributed set of points on the surface of the molecule, dividing all pair-wise distances between these points into 12 preset intervals, and summing the MEP values over all pairs in each interval according to Eq. 5.

$$A(d_l, d_u) = \frac{1}{L} \sum_{i<j} p_i p_j, \quad d_l \leq d_{ij} \leq d_u \qquad \text{Eq. 5}$$

where $p_i$ and $p_j$ are the values of the MEP at the i-th and j-th surface points, $d_{ij}$ is the distance between these points, $d_l$ and $d_u$ are the lower and upper bounds of the auto-correlation interval, and L is the total number of distances in $[d_l, d_u]$. The analysis was based on a single low-energy conformation and a simple Coulomb approach, using partial atomic charges derived with an empirical method. See, for example, Gasteiger, J., Marsili, M., *Tetrahedron*, 1980, 36,3219–3228; and *Angew. Chem. Int. Ed. Engl.*, 1985, 24, 687–689, inorporated by reference in their entireties. In Gasteiger's original publication, these autocorrelation vectors were used to train a Kohonen network, which was able to separate the xanthene from the cubane and adamantane derivatives in a way that was consistent with the 3-dimensional geometry of the scaffolds and the relative disposition of the four amino-acid R-groups.

This data set was subjected to the same type of analysis that was used in the previous example. In particular, 100 independent runs were carried out at 5 different sample sizes (100, 200, 400, 800 and 1600 points), each involving a different set of random points comprising the training set. The networks consisted of 12 input, 10 hidden and 2 output units, having a total of 140 freely adjustable synaptic weights. Similar training parameters were used, with the exception that the training epochs were limited to 10,000 for samples containing 100 and 200 points, and 5,000, 2,000 and 1,000 for samples containing 400, 800 and 1,600 points, respectively. The mean and standard deviation of the stress distributions for each sample size are shown in FIG. 8, along with the stress of the full NLM and PCA projections.

Figure 8:
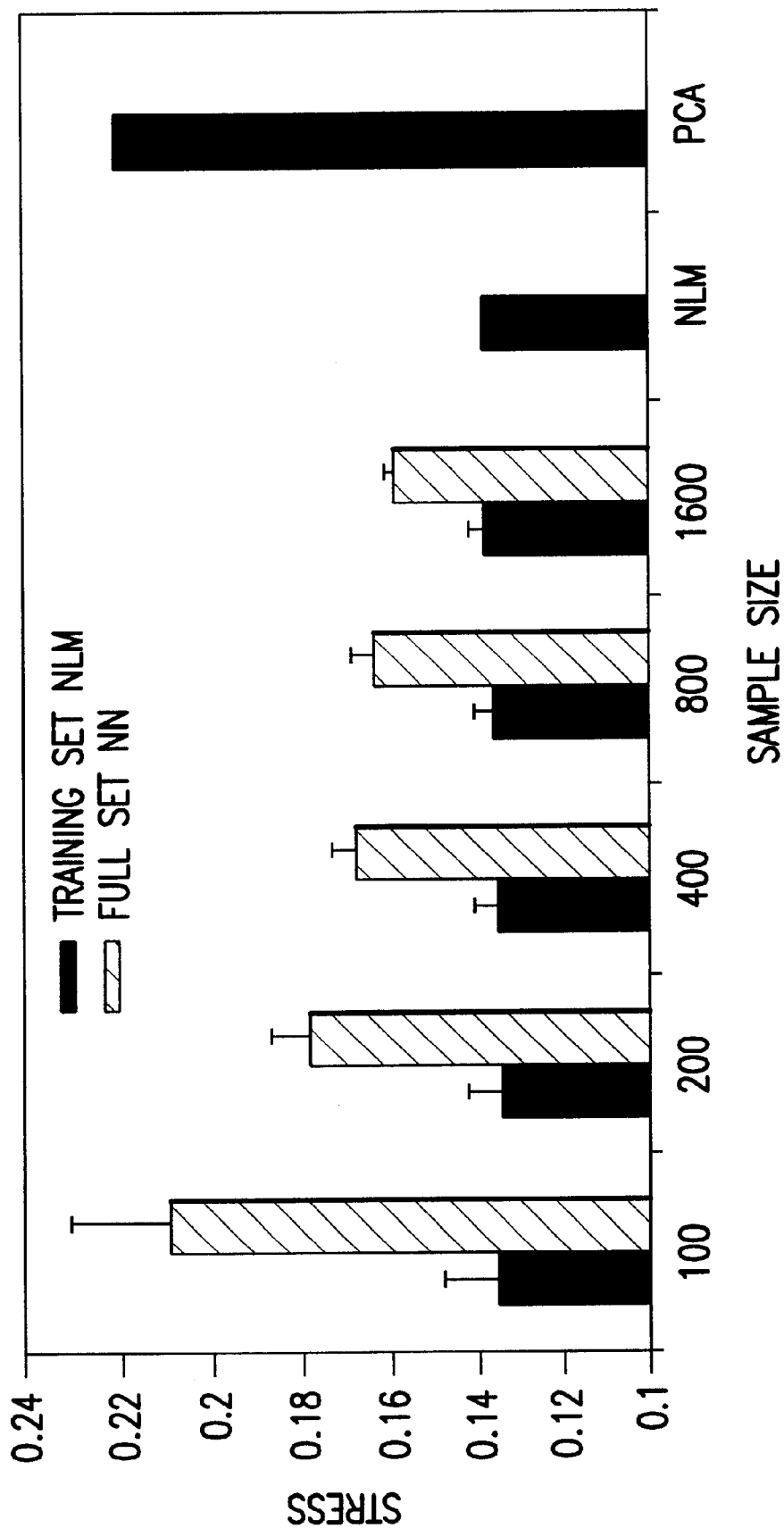
FIG. 8 illustrates stress as a function of sample size for a Gasteigner data set.

FIG. 8 illustrates stress as a function of sample size for the Gasteiger data set. The two columns and their respective error bars represent the mean and standard deviation of the stress of the NLM projection for the training set and the NN projection for the entire data set over 100 runs for 5 different sample sizes. Each run represents a different set of points comprising the training set. The last two columns represent the stress of the NLM and the PC projections of the entire data set, respectively. The plot reveals similar trends to those established in the analysis of the face data. The average stress of the random sample increases with sample size, and the composition of the sample itself becomes less significant as it becomes increasingly more representative of the entire population. Perhaps the most important difference is the rather poor performance of the network with small training sets. Indeed, a network trained with 100 points performs, on average, only slightly better than PCA, as manifested by a mean stress of 0.209 compared to 0.221 for PCA. Two reasons contribute to this problem: first, the training set is not sufficiently representative, and second, the network is very susceptible to ovefitting since there are 140 synaptic weights for only 100 training cases. Overfitting becomes less of a factor as the number of training cases increases, and indeed, the mean stress drops to 0.167±0.005 with 400 points, and to 0.160±0.002 with 1,600 points. These samples represent 0.45% and 1.8% of the entire collection, respectively.

Figure 9C:
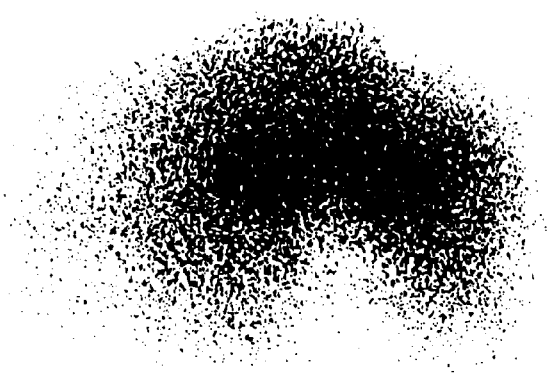
FIG. 9C illustrates a neural network projection of the Gasteiger data set.
Figure 9B:
FIG. 9B illustrates a non-linear mapping projection of the Gasteiger data set.
Figure 9A:
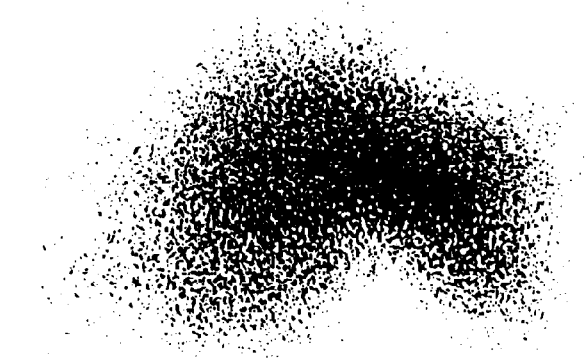
FIG. 9A illustrates a principal component projection of the Gasteiger data set.

The PCA, NLM and neural maps of the three libraries are shown in FIG. 9. The neural map in FIG. 9c was obtained from a network trained with 800 points (800-point training set) and had a stress of 0.162. Again, the NLM and NN maps are essentially indistinguishable, and both reflect the sharp separation between the planar and tetrahedral systems that was observed in the original self-organized maps. In addition, the non linear maps reveal a more subtle distinction between the cubane and adamantane libraries that was not captured by the Kohonen networks. However, the Gasteiger descriptor set is fairly redundant. Principal component analysis reveals that 99% of the variance in the data can be recovered with only 7 PC's (Table 1)(See FIG. 23). The first 2 PC's alone account for nearly 80% of the variance, which explains the relatively low stress (0.22) of the principal component projection. This low effective dimensionality is reflected in the PCA map itself (FIG. 9a), whose overall structure is not dramatically different from that of the non-linear projections. Indeed, the Gasteiger data set does not build a strong case for the use of the numerically more elaborate non-linear methods, at least for exploratory data analysis. However, as we pointed out earlier, the difference between these methods becomes more evident as the dimensionality of the space increases. The final example demonstrates this point with a second combinatorial data set of significantly higher dimensionality.

Figure 10:
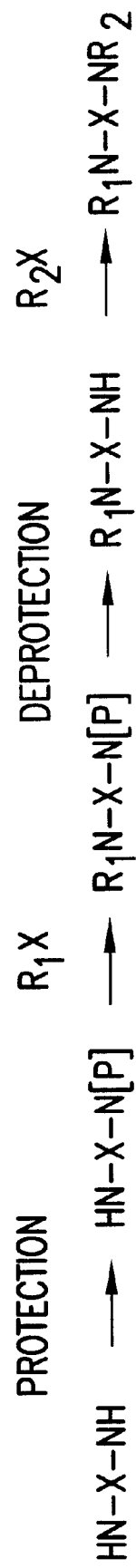
FIG. 10 illustrates a synthetic sequence for generation of a diamine library.

The data set is a 3-component combinatorial library taken from the work of Cramer et al. See for example, Cramer, R. D., Patterson, D. E., Clark, R. D., Soltanshahi, F., Lawless, M. S., *J. Chem. Info. Comput. Sci.*, 1998, incorporated herein by reference in its entirety. A diamine molecule containing two primary or secondary amines served as the central scaffold, and was derivatized on both sides using an acylating agent, reactive halide or carbonyl group susceptible to reductive amination. The synthetic sequence required to generate this library involves selective protection of one of the amines and introduction of the first side chain, followed by deprotection and introduction of the second side chain (FIG. 10). As the original authors noted, use of commercially available reagents alone (the 1996 Available Chemical Directory, marketed by MDL Information Systems, Inc., 140 Catalina Street, San Leandro, Calif. 94577, contained 1750 reagents of type HNXNH and 26,700 reagents of type RX) would yield over $10^{12}$ potential products, 50,000 times more than the world's cumulative chemical literature!

Since the objective of this work was to validate the non-linear mapping algorithm, we generated a smaller library comprised of 57,498 compounds using 42 commercially available diamines and 37 acid chlorides and alkylating agents. Each compound was described by 117 topological indices designed to capture the essential features of the molecular graph, which were subsequently reduced to 16 orthogonal principal components which accounted for 99% of the total variance in the data. These principal components were used as input to the non-linear dimensionality reduction techniques described above. The PCA preprocessing step was necessary in order to eliminate duplication and redundancy in the data, which is typical of graph-theoretic descriptors.

Figure 11:
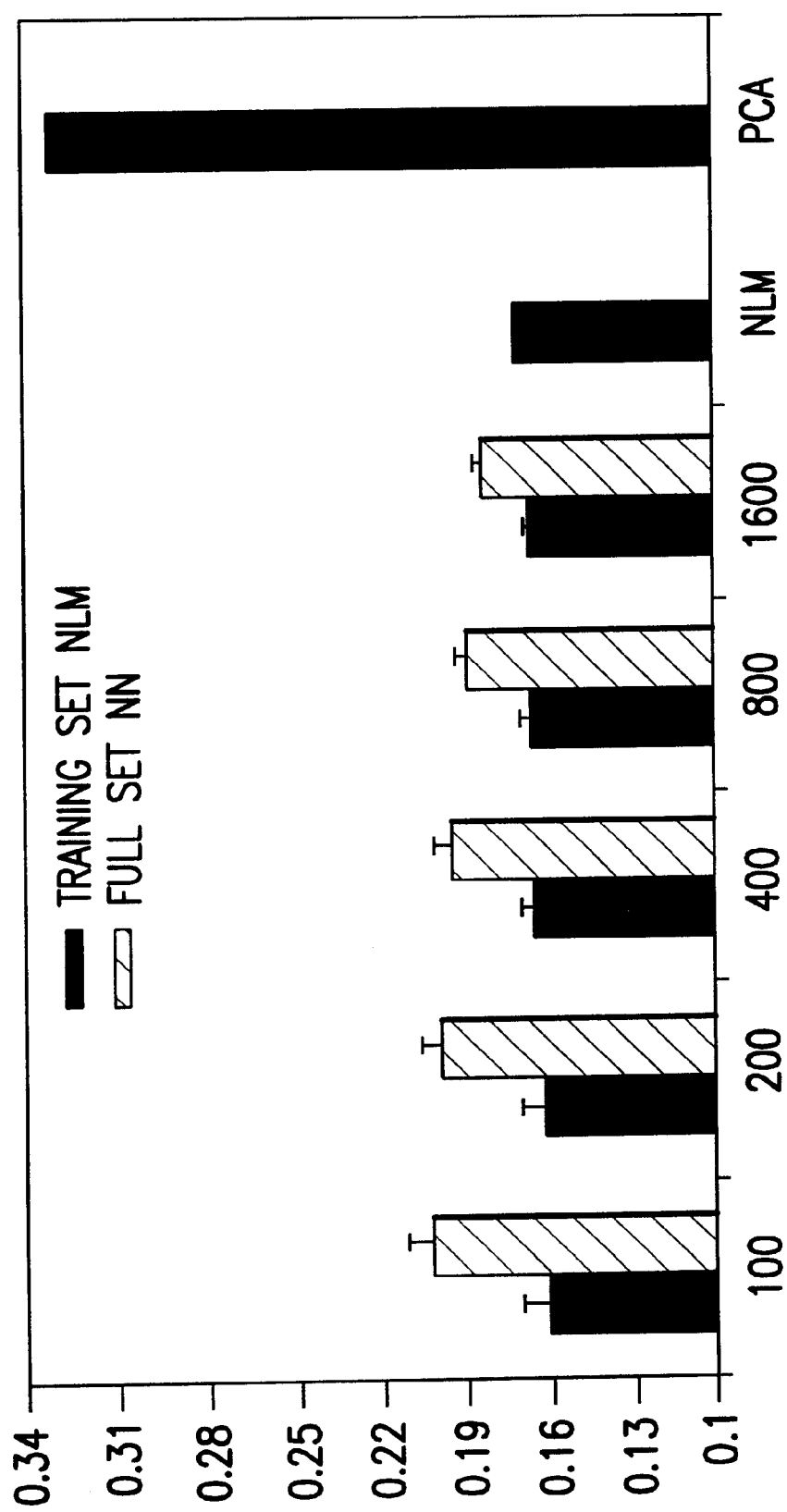
FIG. 11 illustrates stress as a function of sample size for a diamine data set.
Figure 12C:
FIG. 12C illustrates a neural network projection of the diamine data set.
Figure 12B:
FIG. 12B illustrates a non-linear mapping projection of the diamine data set.
Figure 12A:
FIG. 12A illustrates a principal component projection of the diamine data set.

The results are summarized in FIG. 11. FIG. 11 illustrates stress as a function of sample size for the diamine data set. The two columns and their respective error bars represent the mean and standard deviation of the stress of the NLM projection for the training set and the NN projection for the entire data set over 100 runs for 5 different sample sizes. Each run represents a different set of points comprising the training set. The last two columns represent the stress of the NLM and the PC projections of the entire data set, respectively. The network had 16 input, 10 hidden and 2 output neurons (i.e. a total of 180 synaptic weights) and was trained for 10,000 epochs for training sets containing 100 and 200 points, and for 5,000, 2,000 and 1,000 epochs for training sets containing 400, 800 and 1,600 points, respectively. Surprisingly enough, the network does not overfit even with training sets of 100 points (less than 0.2% of the entire library) where there are nearly 2 synapses per training case. Indeed, every single network that we trained outperformed PCA by a wide margin. As for the overall trends, they are no different than those observed in the two previous examples: increase in sample size leads to better approximations and less variability across different samples. A random sample of 400 points (0.7% of the entire library) leads to a neural map with an average stress of 0.193±0.006, while increase in sample size to 1,600 points (2.8% of the entire library) improves the stress to 0.183±0.002, close to the actual NLM stress of 0.169. The resulting maps (FIG. 12) confirm the close agreement between the conventional and neural non-linear mapping algorithms, and the substantial differences between them and PCA which had a stress of 0.332. A look at the variances of the principal components in Table 1, (FIG. 23) reveals why PCA is such a poor method in this case. The first 2 PC's account for only 69% of the total variance in the data, 10% less than the variance captured by the first 2 PC's in the Gasteiger data set, and 14% less than that of the respective components in the face data set. This unaccounted "residual" variance leads to significant distortion in the principal component map, which in the case of the diamine library provides a mere hint of the true structure of the data, evidenced only by the presence of the two disproportionately populated clusters. Finally, the distance plots (FIG. 13) reveal that short distances are distorted much more severely by PCA, a problem that was also encountered to a lesser extent in the face data set (FIG. 6). Conversely, the non-linear maps distribute the error more evenly across the board, and they show little difference between them.

The results described above were based on an extensive but not exhaustive analysis of three very different data sets. Two important observations need to be made. First, no attempt was made to optimize the network parameters for each particular data set. The main focus of this specification is sampling, and to enable comparisons the topology of the network did not change as a function of sample size. The training sets differed greatly in size, and overfitting may have been a contributing factor for some of the results, particularly those obtained from smaller samples. Secondly, although 100 runs were carried out for each particular sample size, the network was trained only once for each particular training set. As a consequence, part of the observed variance in stress may be due to poorly optimized networks stuck in local minima in synaptic weight space. Preliminary calculations have confirmed that there is indeed some variability from one optimization run to another, and the results become significantly better if we perform several optimizations and select the best network for each particular training set. Significant improvements can also be achieved by increasing the number of training epochs or by fine tuning other training parameters such as the learning schedule and momentum, as well as by increasing the number of hidden neurons, particularly for larger samples. We should also mention that neural networks are one of many different non-linear devices that can be used to "learn" a non-linear map, and the structure of these devices can take an arbitrarily complex form. A powerful extension of this method involves use of multiple sub-networks, each specializing in a particular domain of the feature space. Finally, although all our examples were based on 2-dimensional projections, the proposed architecture is general and can be used to extract constraint surfaces of any desired dimensionality.

II. Implementation in a Process

Figure 14:
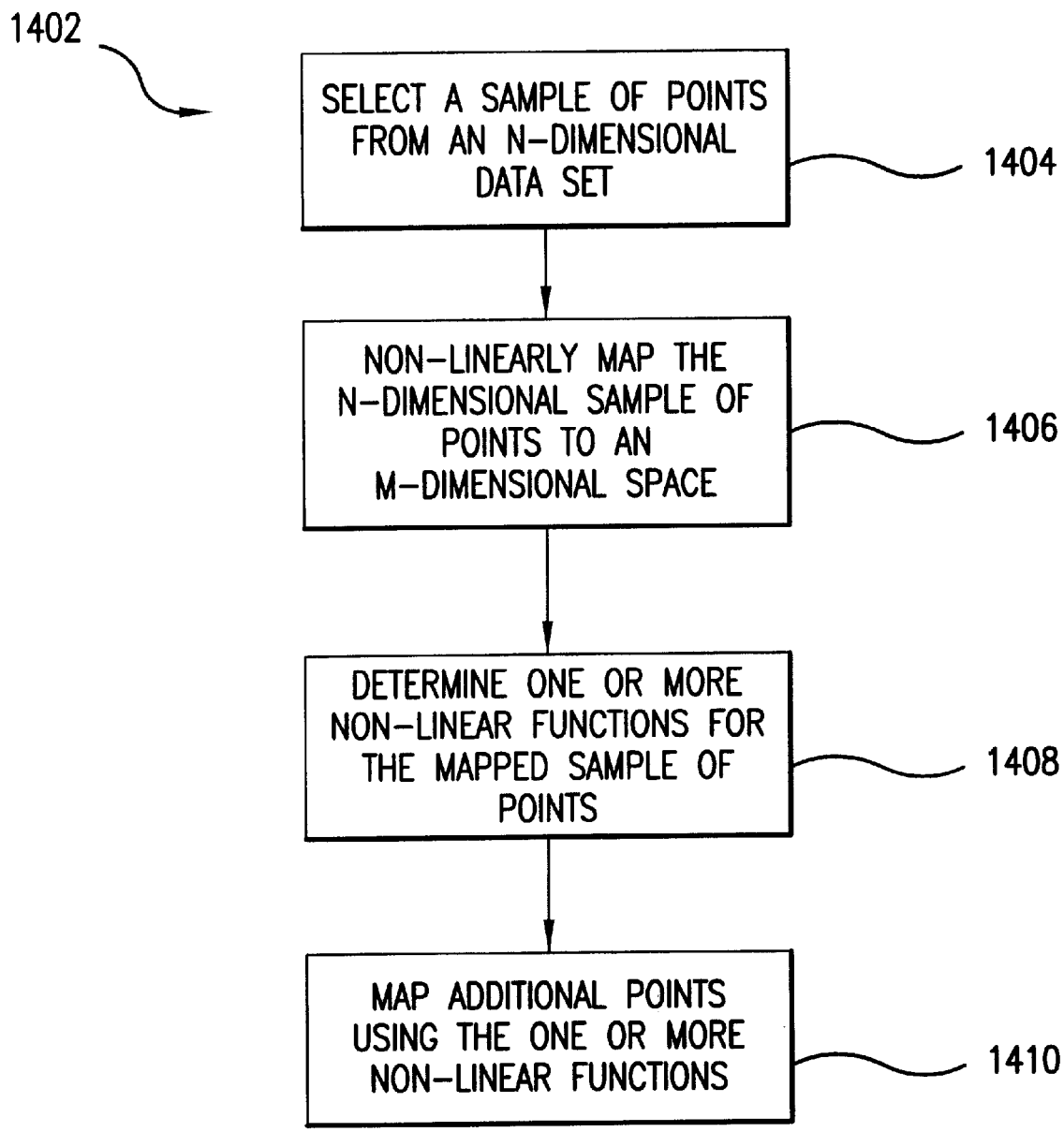
FIG. 14 illustrates an example process flowchart for implementing the present invention.

The present invention is now described in terms of a series of steps which may be performed manually or automatically (or a combination thereof) by an apparatus utilizing hardware, software, firmware, or any combination thereof. FIG. 14 illustrates a process flow chart 1402 implementing the present invention.

A. Selecting a Sample of Points

The process begins at step 1404 which includes selecting a sample of points from an n-dimensional data set. The n-dimensional data set is referred to interchangeably herein as a multi-dimensional data set.

The multi-dimensional data-set can include any of a variety of types of multi-dimensional data, such as, for example, chemical compounds characterized by a set of properties. The properties can include chemical properties, physical properties, biological properties, electronic properties, computed properties and combinations thereof. The multi-dimensional data set can also or alternatively include, protein sequences characterized by a set of properties and/or gene sequences characterized by a set of properties. Typically, the multi-dimensional data is stored in a database of records having numerical fields.

Step 1404 can be performed in any of a variety of ways. For example, the sample of points can be selected randomly, or according to some property or properties associated with the points. The sample of points can be selected to reflect characteristics of the multi-dimensional data set, or to reflect characteristics of a sub-set of the multi-dimensional data set.

B. Non-Linearly Mapping the Sample of Points

Step 1406 includes non-linearly mapping the n-dimensional sample of points to an m-dimensional space, where n and m can be any values, so long as n is greater than m. Step 1406 is also referred to as dimensionality reduction because it scales or reduces the number of dimensions associated with the n-dimensional sample of points. The sample of points are non-linearly mapped using any of a variety of suitable conventional or yet to be developed mapping techniques, or combinations thereof, including, but not limited to techniques disclosed in U.S. Patent Application Ser. No. 09/073,845, filed May 7, 1998, titled, "System, Method and Computer Program Product for Representing Proximity Data in Multi-Dimensional Space."

For example, a sample of points can be non-linearly mapped as follows:
 (a) placing a sample of points from a multi-dimensional data set on a display map, each point in the sample of points having an associated set of N input coordinates and an associated set of M output coordinates, wherein N is greater than M;
 (b) selecting a sub-set of points from the sample of points, wherein the selected sub-set of points includes associated relationships between points in the selected sub-set;
 (c) revising the associated set of M output coordinates for at least one of the points of the sub-set of points based on the relationships between the points; and
 (d) repeating steps (b) and (c) for additional sub-sets of points from the set of points.

C. Determining One or More Non-Linear Functions

Step 1408 includes determining one or more non-linear functions underlying the mapped sample of points. In other words, Step 1408 determines one or more non-linear functions that correlate the n-dimensional sample of points from step 1404 with the corresponding m-dimensional points from step 1406. Step 1408 can be performed using any of a variety of techniques, including self learning or organizing techniques such as, but not limited to, multilayer neural networks, as well as other search and/or optimization techniques including, but not limited to, Monte Carlo/random sampling, greedy search algorithms, simulated annealing, evolutionary programming, genetic algorithms, genetic programming, gradient minimization techniques, and combinations thereof.

Preferably, the one or more non-linear functions of step 1408 are derived from a basis set of linear and/or non-linear functions combined in a linear and/or non-linear manner. In an embodiment, the basis set of linear and/or non-linear functions can include, but are not limited to analytical functions, look-up tables, software modules and/or subroutines, hardware, and combinations thereof.

D. Mapping Additional Points Using the Non-Linear Functions

Step 1410 includes mapping additional points using the one or more non-linear functions determined in step 1408. In other words, the one or more non-linear functions are then used to map additional n-dimensional points to the m-dimensional space. The additional points can include remaining members of the original n-dimensional data-set and/or new, previously unseen points, which are not part of the original n-dimensional data-set.

III. Implementation in a System

Figure 15A:
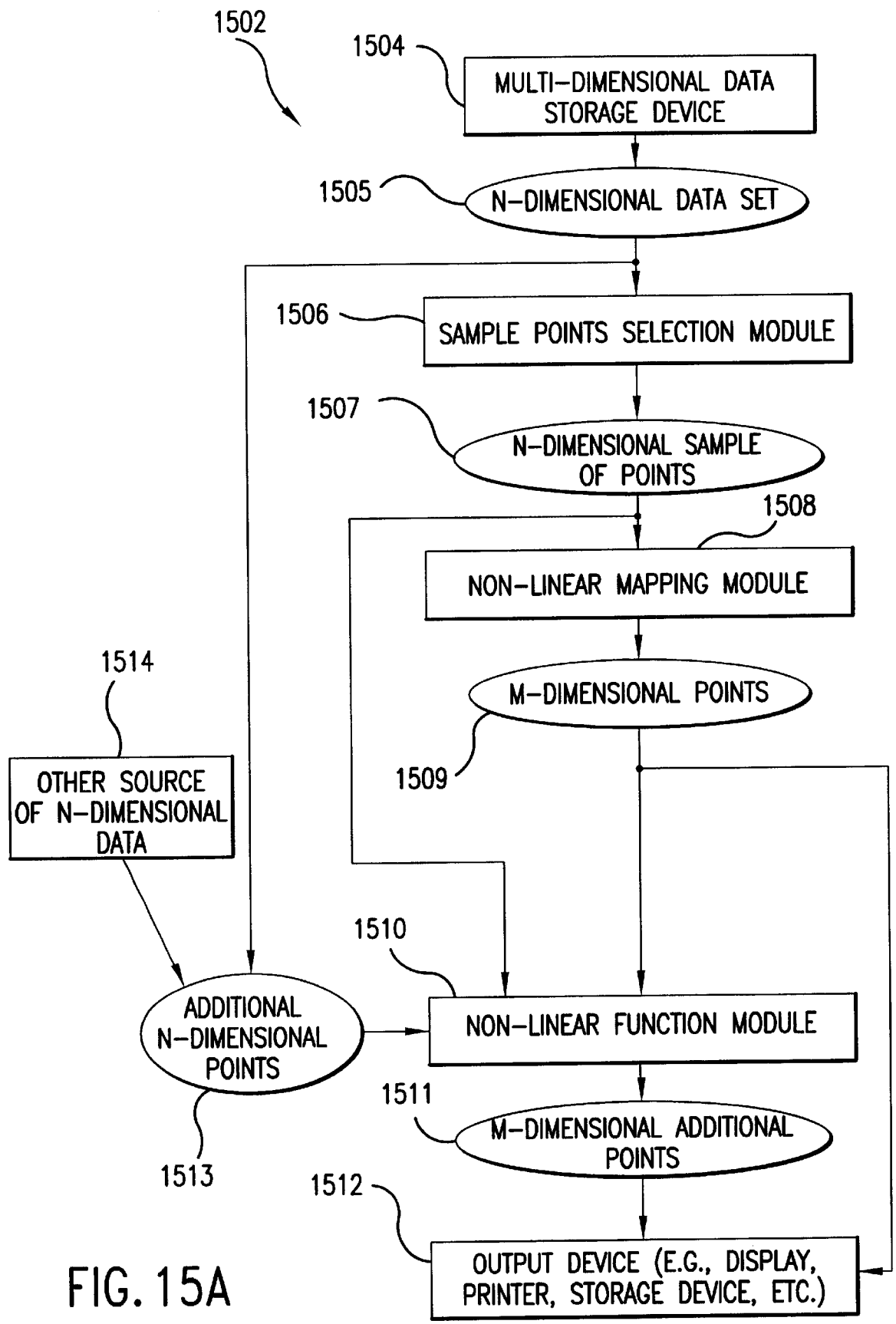
FIG. 15A illustrates an example block diagram of a system and data flow for implementing the present invention.

The present invention can be implemented in hardware, software, firmware or combinations thereof. FIG. 15A illustrates an exemplary block diagram of modules and data flow that can be included in a system 1502 that implements the present invention. The block diagram of FIG. 15A is intended to aid in the understanding of the present invention. The present invention is not limited to the exemplary embodiment illustrated in the block diagram of FIG. 15A.

The system 1502 includes a multi-dimensional storage or data generation device 1504, a sample points selection module 1506, a non-linear mapping module 1508,, a non-linear function module 1510, and an output device 1512, which can be, for example, a display, a printer, a storage device, etc.

In operation, the multi-dimensional storage or data generation device 1504 provides an n-dimensional data set 1505 to the sample points selection module 1506.

The sample points selection module 1506 selects a sample of points 1505 from the n-dimensional data set 1505, as described in step 1404. The sample of points 1505 is provided to the non-linear mapping module 1508.

The non-linear mapping module 1508 maps the n-dimensional sample points 1507 to an m-dimensional space, as described in Step 1406. The non-linear mapping module 1507 provides m-dimensional sample points 1509 to the non-linear function module 1510.

The non-linear function module 1510 receives the m-dimensional sample points 1509 and the n-dimensional sample of points 1507, and determines one or more non-linear functions that define one or more relationships between the two, as described in step 1408. The m-dimensional points 1509 are optionally provided to the output device 1512, for display, printing, storage, etc.

After the non-linear function module 1510 determines the one or more non-linear functions, the non-linear function module 1510 operates in a feed-forward manner to map additional n-dimensional points 1513 to the m-dimensional space, as described in step 1410. The additional n-dimensional points 1513 can include remaining members of the n-dimensional data set 1505 and/or new, previously unseen points from other sources 1514. The results are illustrated here as m-dimensional additional points 1511, which are optionally provided to the output device 1512.

In the feed-forward mode of operation, the non-linear function module 1510 multi-dimensionally maps, or scales, the additional n-dimensional points 1513 without using the non-linear mapping module 1508. This is important because large numbers of additional points can be efficiently handled by the one or more non-linear functions of the non-linear function module. Conventional non-linear mapping techniques used in the non-linear mapping module, on the other hand, do not scale well for large multi-dimensional data sets.

Figure 15B:
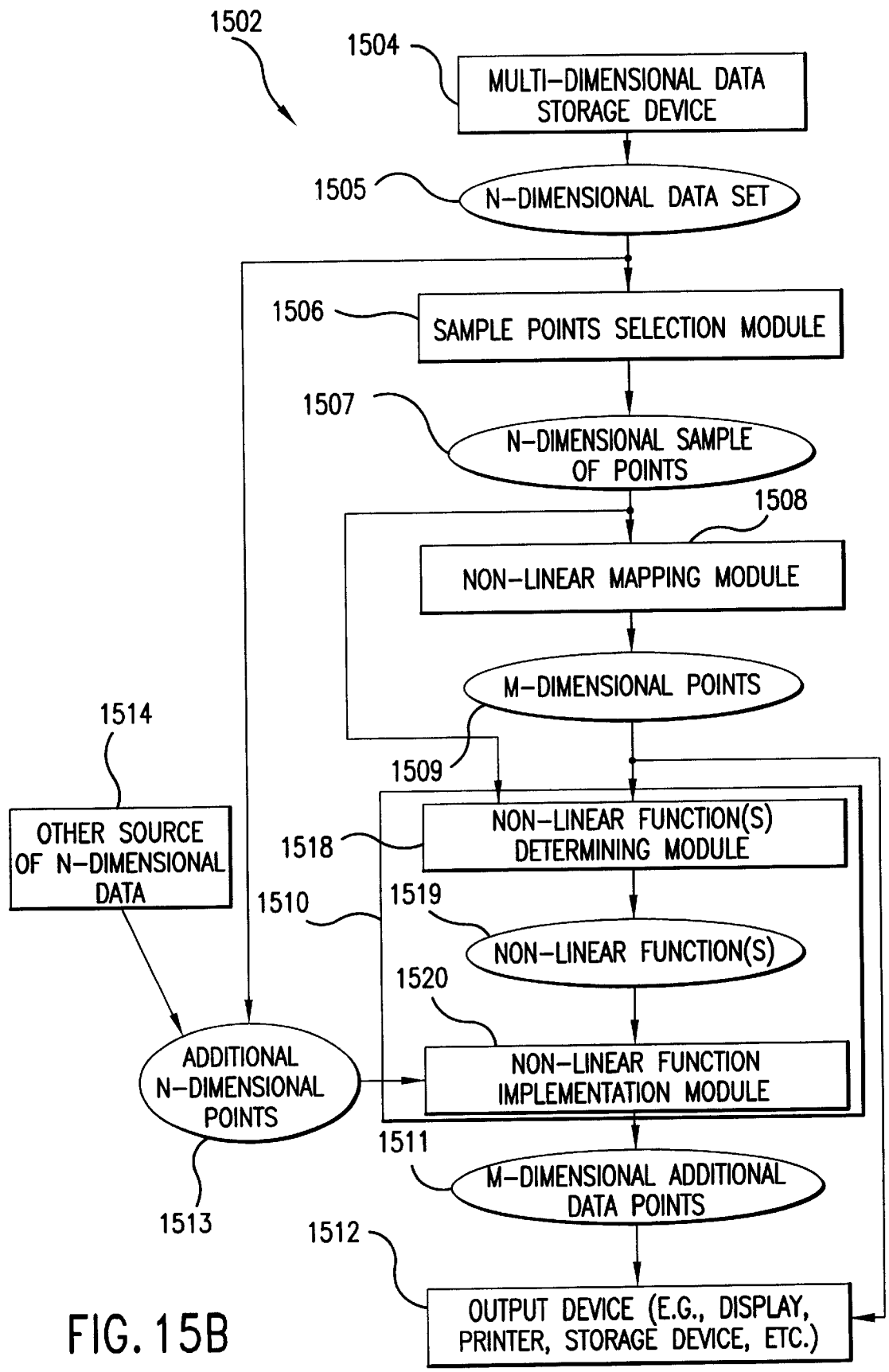
FIG. 15B illustrates an example block diagram of a system and data flow for implementing the present invention.

The non-linear function module 1510 can include hardware, software, firmware, or combinations thereof. FIG. 15B illustrates an exemplary implementation, of the non-linear function module 1510, including a non-linear function (s) determining module 1518 and a non-linear function implementation module 1520.

The non-linear function(s) determining module 1518 determines one or more non-linear functions 1519, as described in step 1408. Preferably, the non-linear function(s) determining module 1518 determines, or derives the one or more non-linear functions from a basis set of linear and/or non-linear functions combined in a linear and/or non-linear manner. In an embodiment, the basis set of linear and/or non-linear functions can include, but are not limited to analytical functions, look-up tables, software modules and/or sub-routines, hardware, and combinations thereof.

In an embodiment, the non-linear function(s) determining module 1518 determines, or derives, the one or more non-linear functions using any of a variety of techniques including self learning or organizing techniques such as, but not limited to, multilayer neural networks, as well as other search and/or optimization techniques including, but not limited to, Monte Carlo/random sampling, greedy search algorithms, simulated annealing, evolutionary programming, genetic algorithms, genetic programming, gradient minimization techniques, and combinations thereof.

The one or more non-linear functions 1519 are provided to the non-linear function implementation module 1520, which uses them in a feed-forward manner to map the additional n-dimensional points 1513, as described in step 1410.

When the non-linear function module 1510 includes self-learning or training systems, such as multi-layer neural networks, the non-linear function(s) determining module 1518 represents the training of the self-learning system and the non-linear function implementation module 1520 represents operation of the self-learning system in a feed-forward (predictive) manner.

IV. Additional Features of the Invention

Additional features of the invention and optional implementation enhancements are now described.

A. Multiple Non-Linear Functions

In an embodiment, multiple non-linear functions are determined or derived for the n-dimensional points. In an embodiment, non-linear functions are determined for different sub-sets of points. In an embodiment, one or more of the sub-sets of points overlap. In an alternative embodiment, the multiple sub-sets of point are mutually exclusive.

Figure 16:
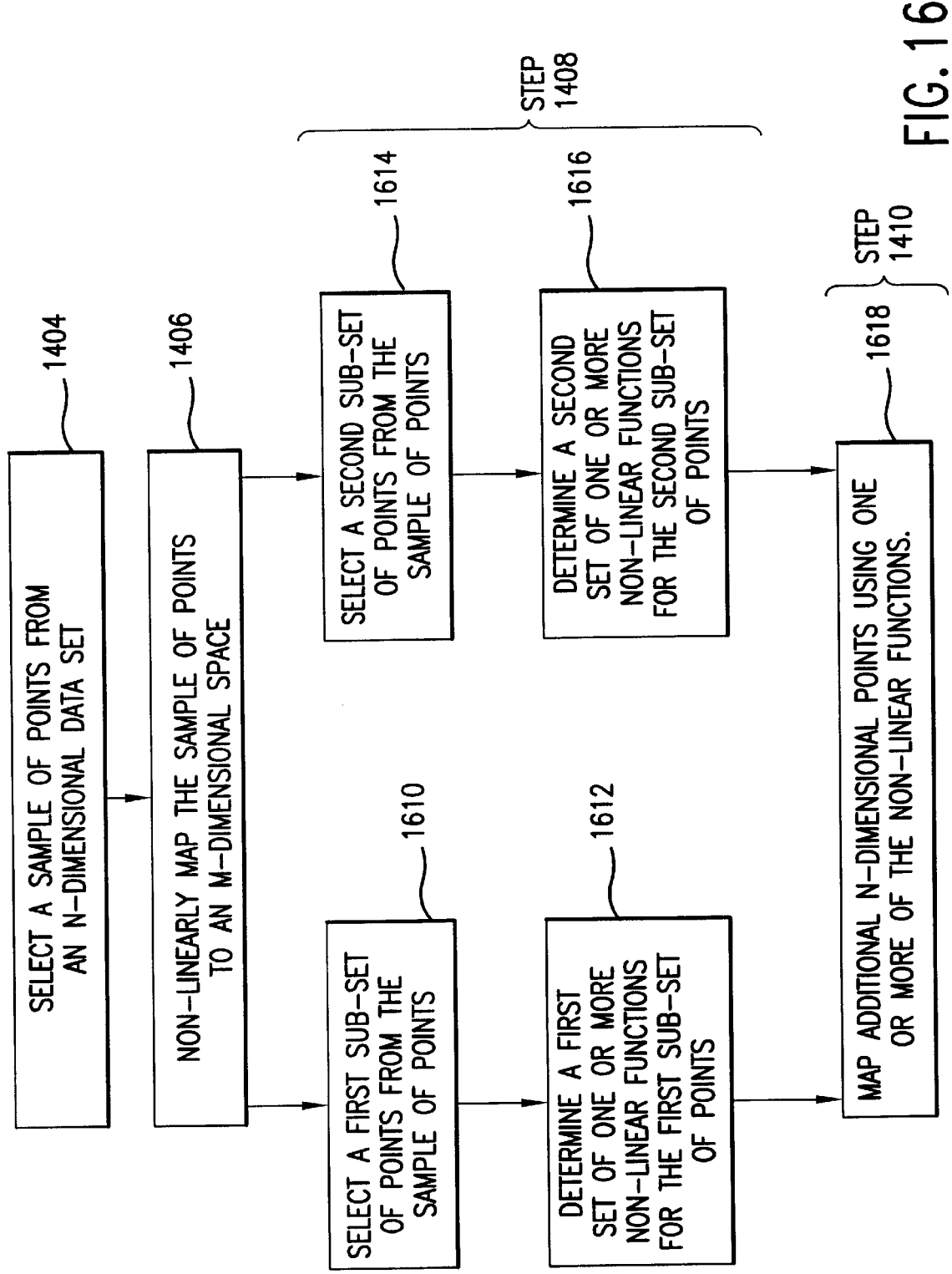
FIG. 16 illustrates an example process flowchart for utilizing multiple non-linear functions, in accordance with the present invention.

FIG. 16 is a process flowchart 1602 that illustrates an example process for determining and using multiple non-linear functions for non-linearly mapping multi-dimensional points. The process begins with steps 1404 and 1406, as previously described. Step 1406 can be performed with conventional, or classical non-linear mapping techniques, or with new and/or yet to be determined techniques.

The process proceeds to step 1408, which is illustrated in the process flowchart 1602 as steps 1610 through 1616. Step 1610 includes selecting a first sub-set of points from the sample of points. Step 1612 includes determining a first set of one or more non-linear functions for the first sub-set of points. Step 1614 includes selecting a second sub-set of points from the sample of points. Step 1616 includes determining a second set of one or more non-linear functions for the second sub-set of points. Additional sub-sets of points can be selected from the sample of points and additional sets of one or more non-linear functions can be determined, or derived, for the additional sub-sets of points. In an embodiment, two or more of the sub-sets of points overlap. In an alternative embodiment, the sub-sets of points are mutually exclusive of one another.

Step 1410 is illustrated in flowchart 1602 as step 1618, which includes mapping additional n-dimensional points using one or more of the non-linear functions (i.e., operating the non-linear functions in a feed-forward, or predictive manner). This typically involves directing the additional n-dimensional point to one or more of the non-linear functions derived in steps 1612 and 1616. This can be performed in a variety of ways.

In an exemplary embodiment, each set of the one or more non-linear functions derived in steps 1612 and 1616 is associated with a point or region in the n-dimensional space. When an additional n-dimensional point is to be non-linearly mapped, one of the sets of non-linear functions is selected to perform the mapping, based on the proximity of the additional point to the points or regions associated with the sets of non-linear functions. In an embodiment, the additional point is mapped by the "nearest" non-linear function(s).

Figure 17:
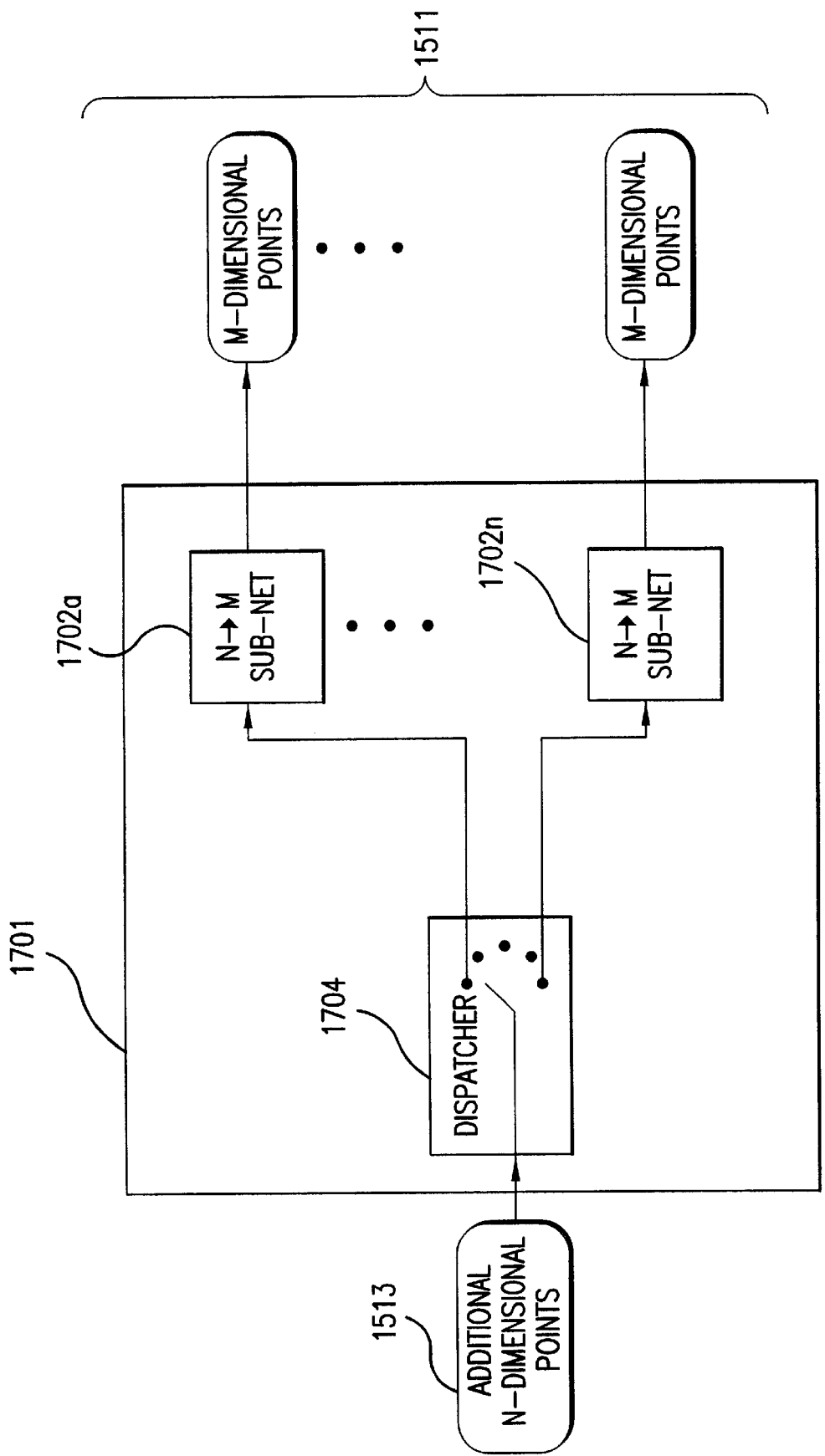
FIG. 17 illustrates an example block diagram of a system and data flow for implementing multiple non-linear functions in accordance with the present invention.
Figure 20A:
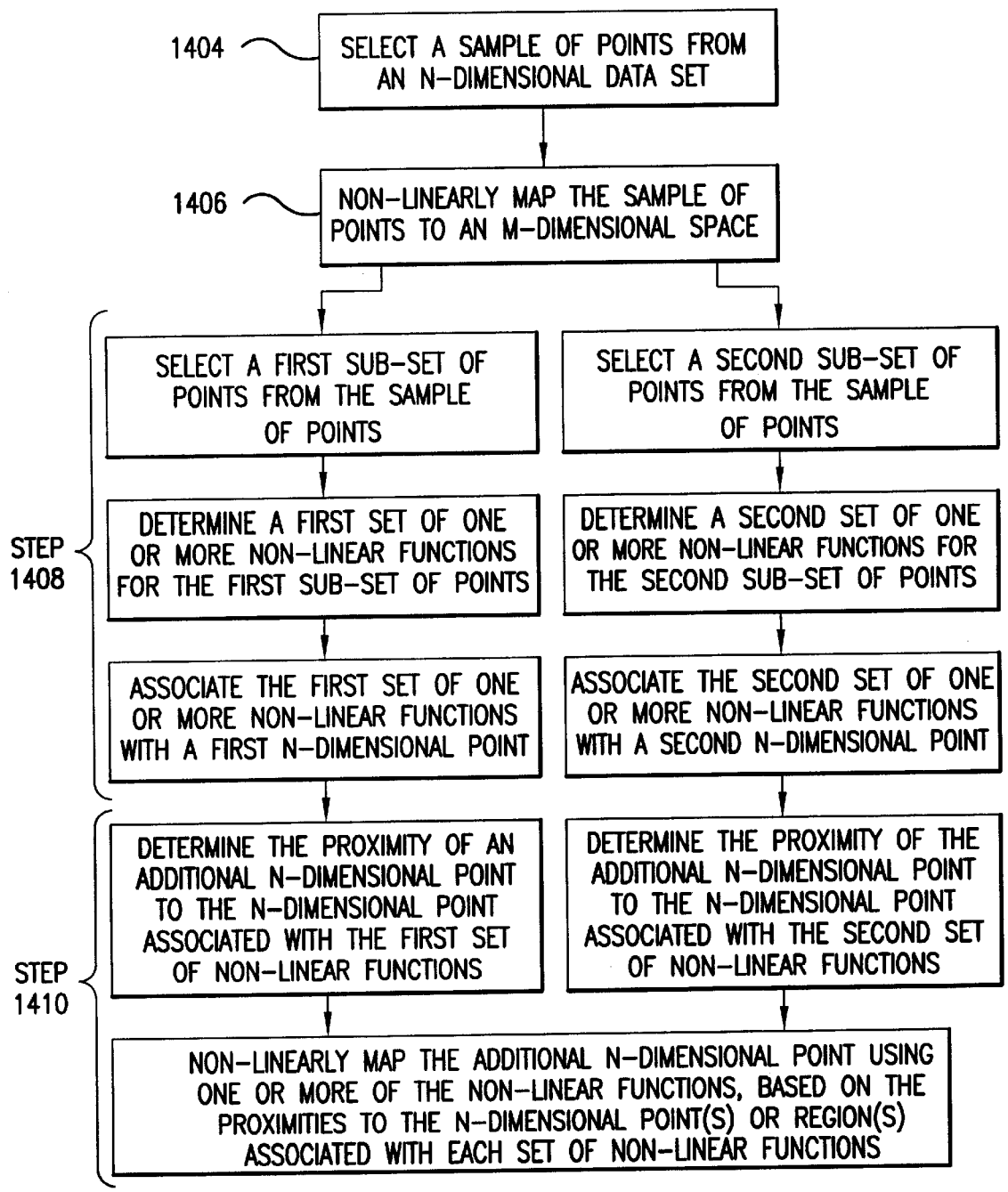
FIG. 20A illustrates an example process flowchart for utilizing multiple non-linear functions, in accordance with the present invention.

This process is illustrated in the process flowchart of FIG. 20A. FIG. 17 illustrates an example non-linear function module 1701, for implementing the process. The non-linear function module 1701 is an example implementation of the non-linear function module 1510 of FIG. 15A. In FIG. 17, the non-linear function module 1701 includes a plurality of sub-nets 1702*a*–1702*n*, which represent the multiple sets of non-linear functions derived in steps 1612 and 1616. Each sub-net 1702 can include or employ any non-linear technique, or combination of non-linear techniques, as previously described.

The non-linear function module 1701 also includes a dispatcher 1704 that directs additional n-dimensional points 1513 to one or more of the sub-nets 1702. Selected sub-nets 1702 non-linearly map the additional n-dimensional points 1513 from n-dimensions to m-dimensions.

The dispatcher 1704 selects one or more of the sub-nets 1702 in any suitable manner. In an embodiment, each sub-net 1702 is associated with a different point or region in the n-dimensional space. The dispatcher 1704 selects one or more of the sub-nets 1702 based on the proximity of an additional point 1513 to the points or regions associated with the sub-nets 1702. Typically, the sub-net(s) 1702 "nearest" to the additional point 1513 are selected to non-linearly map the additional point.

In an alternative embodiment, the sub-nets 1702 are associated with points or regions in the m-dimensional space, rather than in the n-dimensional space. The dispatcher 1704 directs the additional n-dimensional points 1513 to one or more of the sub-nets 1702, based on the proximity of approximated m-dimensional coordinates of the additional points 1513 to the m-dimensional point or region associated with the sub-nets 1702.

Figure 19:
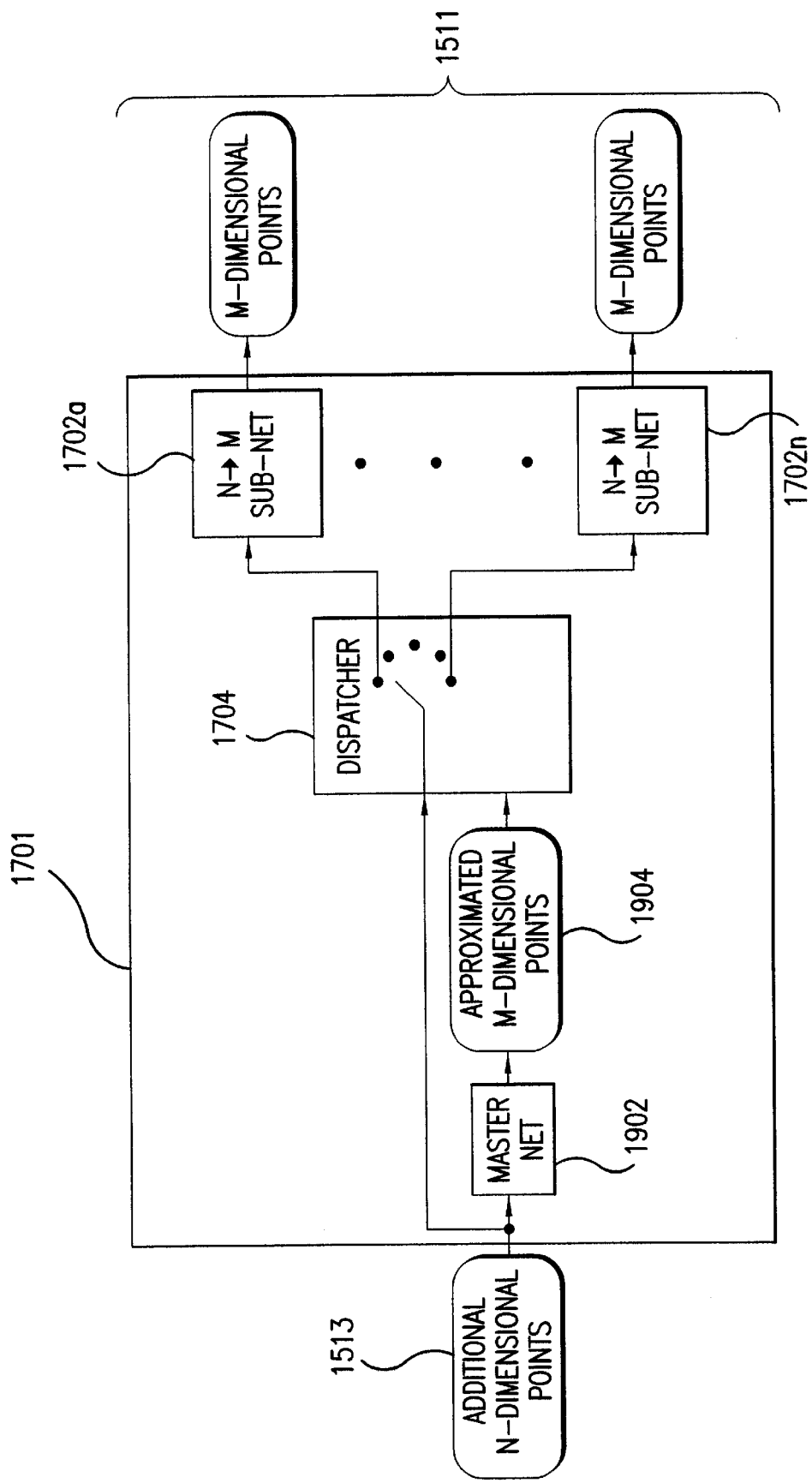
FIG. 19 illustrates an example block diagram of a system and data flow for implementing multiple non-linear functions, in accordance with the present invention.
Figure 20B:
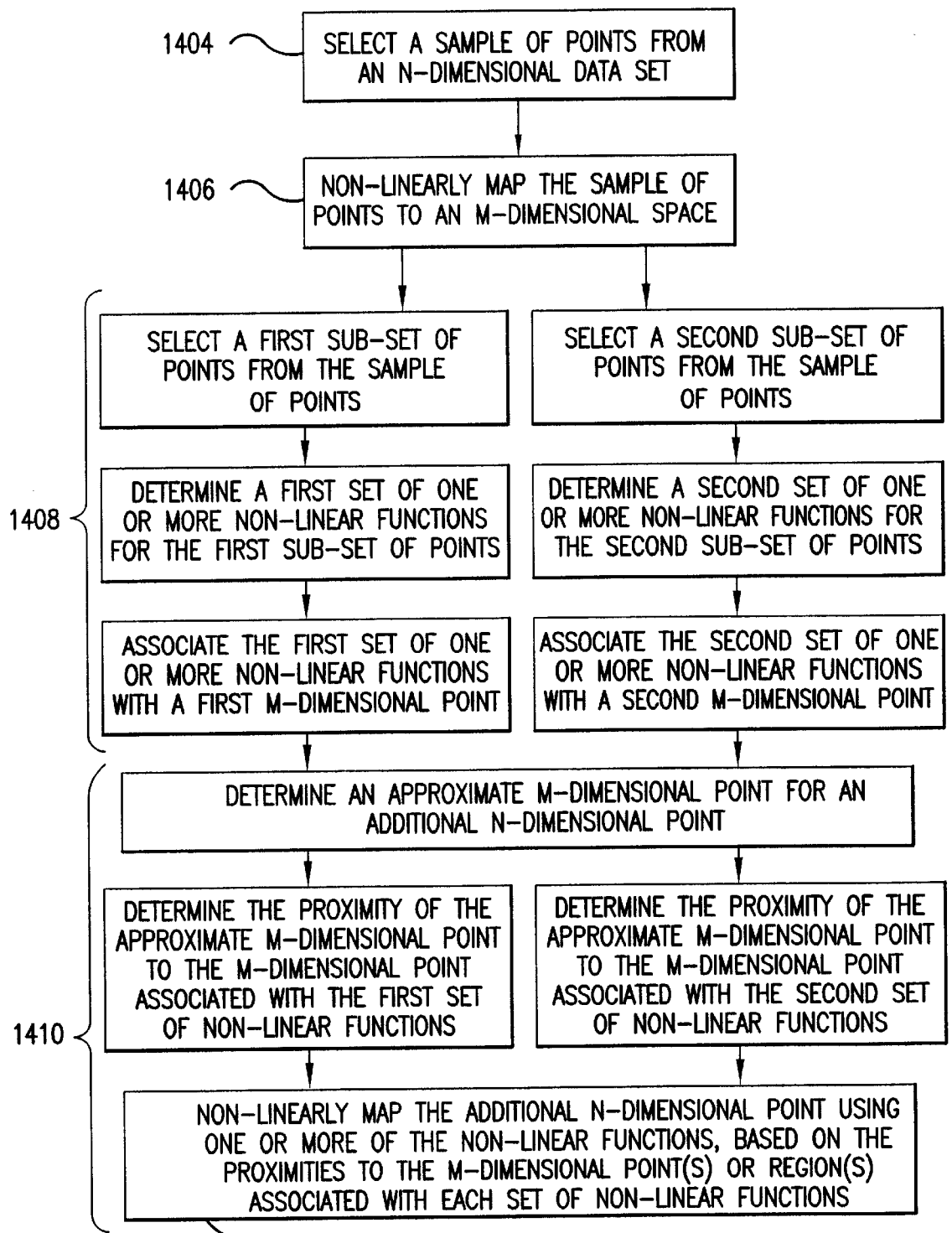
FIG. 20B illustrates an example process flowchart for utilizing multiple non-linear functions, in accordance with the present invention.

This process is illustrated in the process flowchart of FIG. 20B. FIG. 19 illustrates the example non-linear function module 1701, including a master net 1902, which approximates m-dimensional coordinates, or points, 1904 for the additional n-dimensional points 1513. The master net 1902 preferably uses one or more non-linear functions, which can be determined or derived during the training phase of step 1406. For example, the master net 1902 can be trained from the sample of points or from a sub-sample thereof.

The dispatcher 1704 directs the additional n-dimensional points 1513 to one or more of the sub-nets 1702, based on the proximity of the approximated m-dimensional coordinates 1904 to the m-dimensional points or regions associated with the sub-nets 1702.

When the dispatcher 1704 selects multiple sub-nets 1702 to non-linearly map an additional point 1513, as illustrated in FIGS. 17 and 19, for example, the outputs of the multiple selected sub-nets 1702 are combined in a suitable manner to produce m-dimensional coordinates, or points, 1511.

Figure 18:
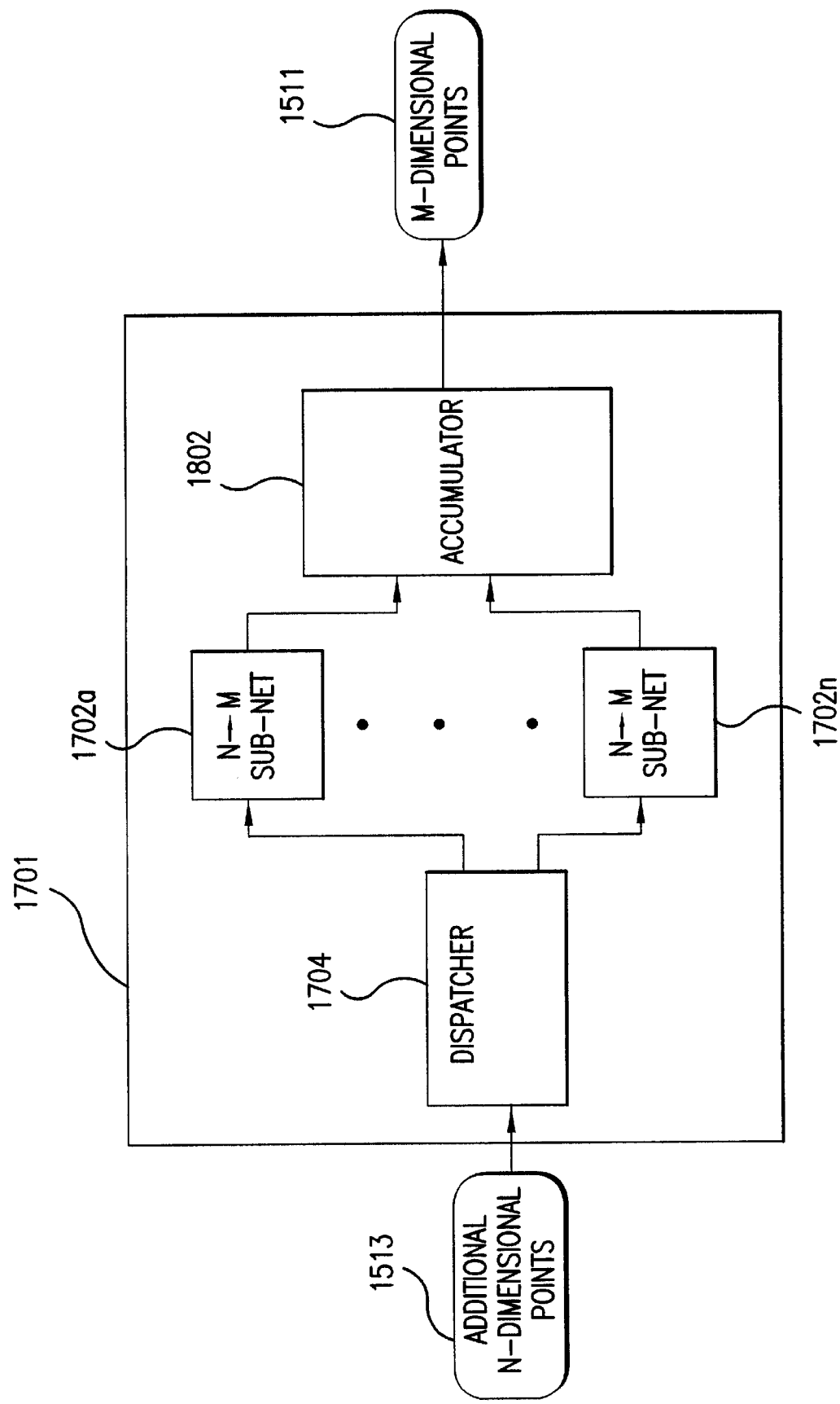
FIG. 18 illustrates an example block diagram of a system and data flow for implementing multiple non-linear functions, in accordance with the present invention.
Figure 21A:
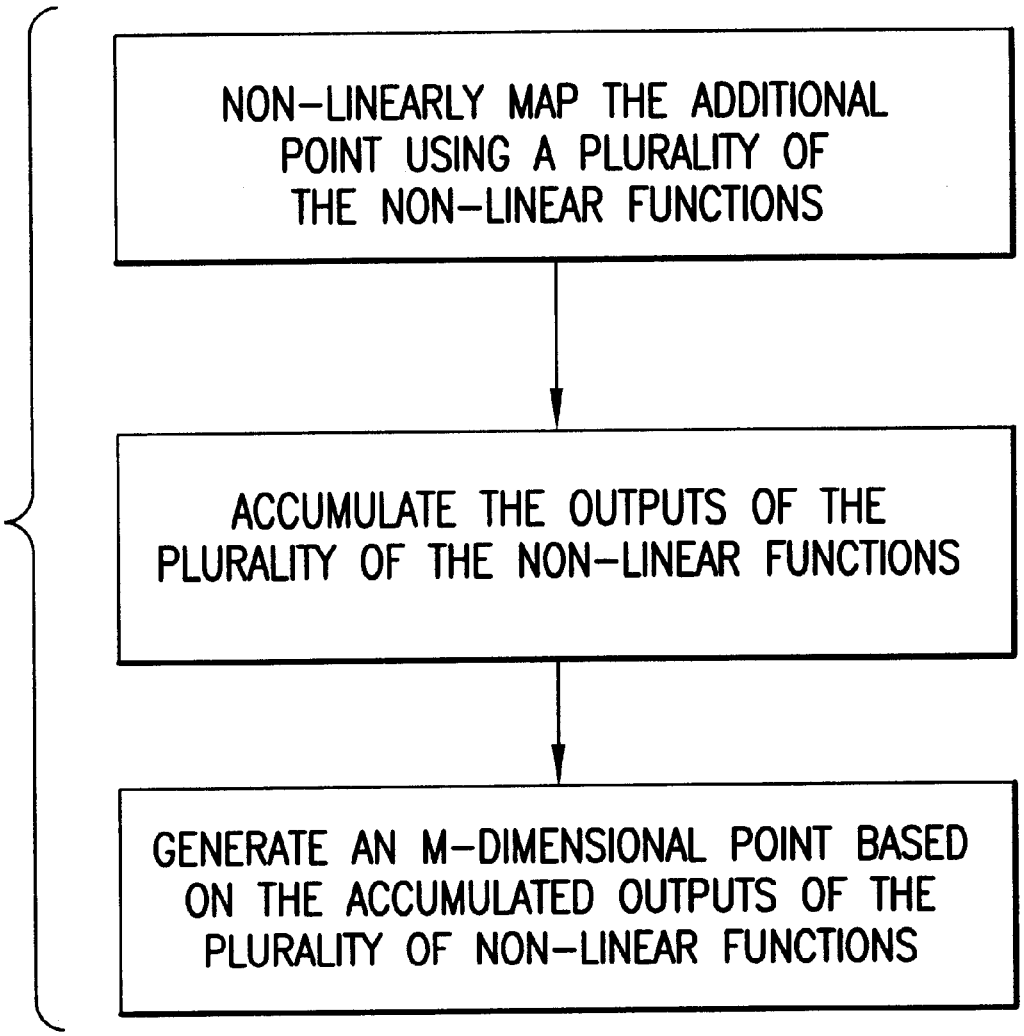
FIG. 21A illustrates an example process flowchart for utilizing multiple non-linear functions, in accordance with the present invention.
Figure 21B:
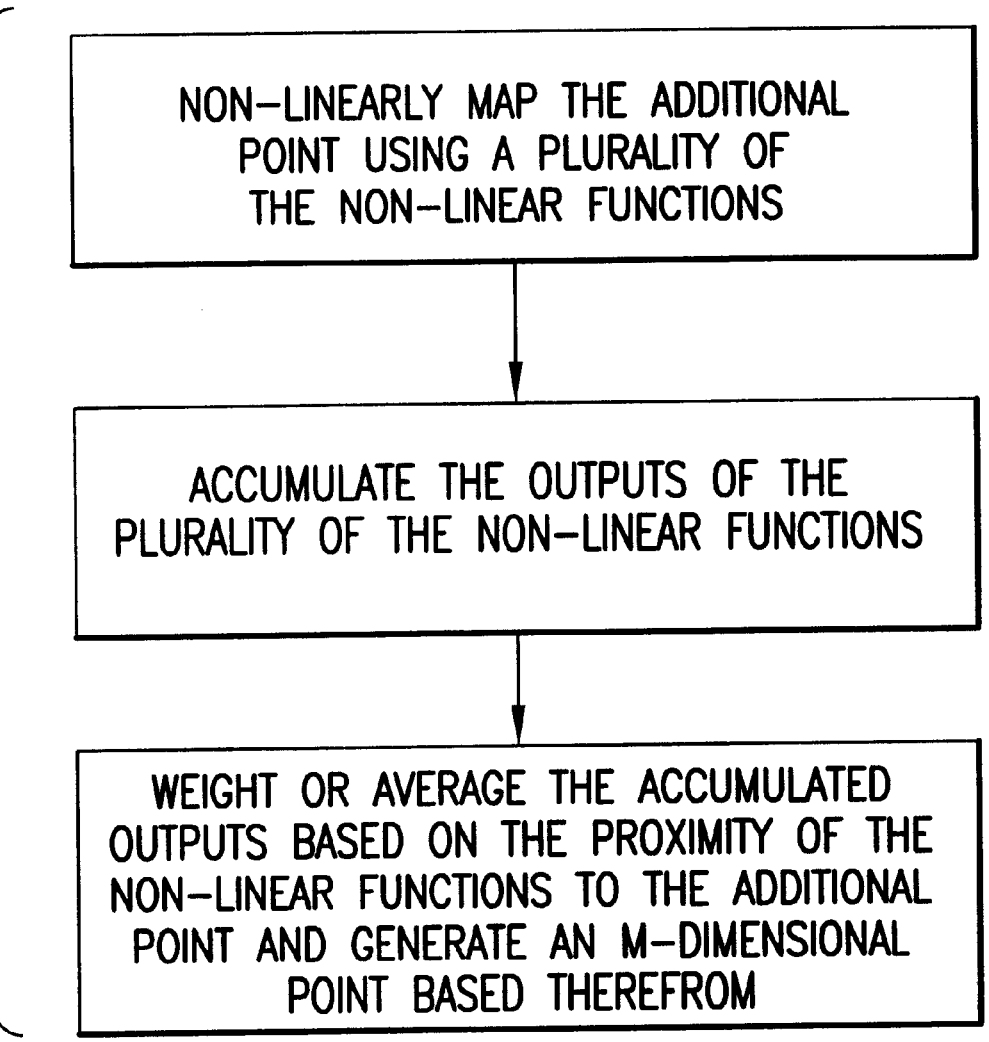
FIG. 21B illustrates an example process flowchart for utilizing multiple non-linear functions, in accordance with the present invention.

FIGS. 21A and 21B illustrate example process flowcharts for combining outputs of multiple sub-nets 1702. FIG. 18 illustrates an example implementation for combining the outputs of multiple selected sub-nets 1702. In FIG. 18, the non-linear function module 1701 includes an accumulator 1802 that accumulates outputs from multiple selected sub-nets 1702, for an additional point 1513. The accumulator combines the outputs from the multiple sub-nets 1702 in a suitable manner and outputs m-dimensional point 1511. In an embodiment, the accumulator 1802 weights or averages the outputs from the multiple sub-nets 1702, based on the proximity of the additional point 1513 to the point or region associated with the the sub-nets 1702.

V. Implementation in a Computer Program Product

Figure 22:
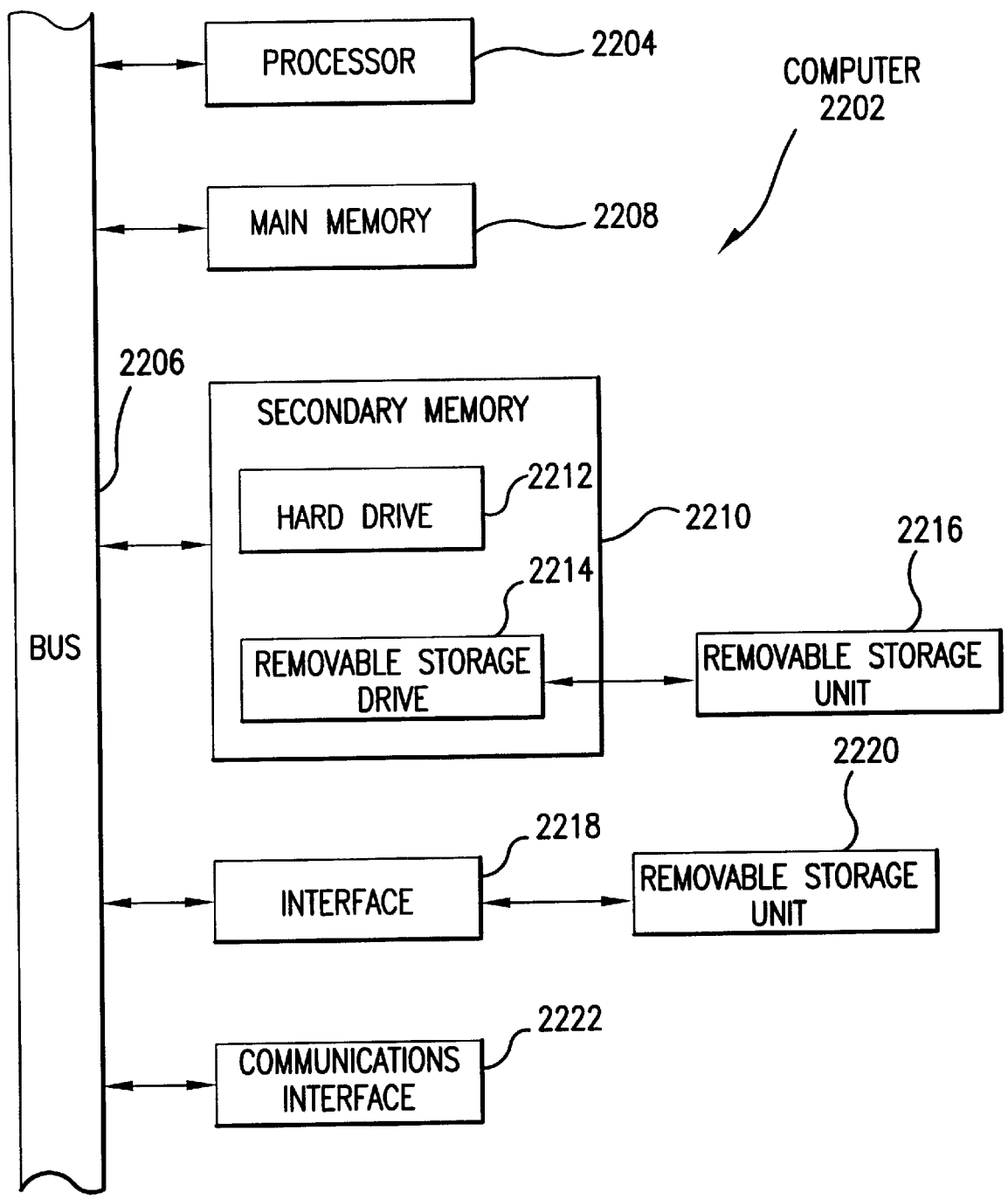
FIG. 22 illustrates an example computer system that can be used to implement the present invention.

The present invention can be implemented using one or more computers. Referring to FIG. 22, an exemplary computer 2202 includes one or more processors, such as processor 2204. Processor 2204 is connected to a communication bus 2206. Various software embodiments are described in terms of this example computer system. After reading this description, it will become apparent to a person skilled in the relevant art(s) how to implement the invention using other computer systems and/or computer architectures.

Computer 2202 also includes a main memory 2208, preferably random access memory (RAM), and can also include one or more secondary storage devices 2210. Secondary storage devices 2210 can include, for example, a hard disk drive 2212 and/or a removable storage drive 2214, representing a floppy disk drive, a magnetic tape drive, an optical disk drive, etc. Removable storage drive 2214 reads from and/or writes to a removable storage unit 2216 in a well known manner. Removable storage unit 2216 represents a floppy disk, magnetic tape, optical disk, etc., which is read by and written to by removable storage drive 2214. Removable storage unit 2216 includes a computer usable storage medium having stored: therein computer software and/or data.

In alternative embodiments, the computer 2202 can include other similar means for allowing computer programs or other instructions to be loaded into computer 2202. Such means can include, for example, a removable storage unit 2220 and an interface 2218. Examples of such can include a program cartridge and cartridge interface (such as that found in video game devices), a removable memory chip (such as an EPROM, or PROM) and associated socket, and other removable storage units 2220 and interfaces 2218 which allow software and data to be transferred from the removable storage unit 2220 to computer 2202.

The computer 2202 can also include a communications interface 2222. Communications interface 2222 allows software and data to be transferred between computer 2202 and external devices. Examples of communications interface 2222 include, but are not limited to, a modem, a network interface (such as an Ethernet card), a communications port, a PCMCIA slot and card, etc. Software and data transferred via communications interface 2222 are in the form of signals (typically data on a carrier) which can be electronic, electromagnetic, optical or other signals capable of being received by communications interface 2222.

In this document, the term "computer program product" is used to generally refer to media such as removable storage units 2216, 2220, a hard drive 2212 that can be removed from the computer 2202, and signals carrying software received by the communications interface 2222. These computer program products are means for providing software to the computer 2202.

Computer programs (also called computer control logic) are stored in main memory and/or secondary storage devices 2210. Computer programs can also be received via communications interface 2222. Such computer programs, when executed, enable the computer 2202 to perform the features of the present invention as discussed herein. In particular, the computer programs, when executed, enable the processor 2204 to perform the features of the present invention. Accordingly, such computer programs represent controllers of the computer 2202.

In an embodiment where the invention is implemented in whole or in part, using software, the software can be stored in a computer program product and loaded into computer 2202 using removable storage drive 2214, hard drive 2212, and/or communications interface 2222. The control logic (software), when executed by the processor 2204, causes the processor 2204 to perform the functions of the invention as described herein.

In another embodiment, the automated portion of the invention is implemented primarily or entirely in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

The computer 2202 can be any suitable computer, such as a computer system running an operating system supporting a graphical user interface and a windowing environment. A suitable computer system is a Silicon Graphics, Inc. (SGI) workstation/server, a Sun workstation/server, a DEC workstation/server, an IBM workstation/server, an IBM compatible PC, an Apple Macintosh, or any other suitable computer system, such as one using one or more processors from the Intel Pentium family, such as Pentium Pro or Pentium II. Suitable operating systems include, but are not limited to, IRIX, OS/Solaris, Digital Unix, AIX, Microsoft Windows 95/NT, Apple Mac OS, or any other operating system. For example, in an exemplary embodiment the program may be implemented and run on an Silicon Graphics Octane workstation running the IRIX 6.4 operating system, and using the Motif graphical user interface based on the X Window System.

In an embodiment, the system 1502 is implemented, in whole or in part, in the computer 2202.

VI. Conclusions

This specification describes new non-linear mapping systems, methods, and computer program products, designed specifically for very large data sets, and useful for smaller data sets as well. In an embodiment, the invention combines "conventional" non-linear mapping techniques with feed-forward neural networks, and allows the processing of data sets orders of magnitude larger than those accessible using conventional methodologies. Embodiments use one or more classical techniques, or equivalents thereof, to multi-dimensionally scale a sample, which may be a small random sample, and then "learn" one or more underlying non-linear transforms using, for example, a multi-layer perceptron. Once trained, the neural network can be used in a feed-forward manner to project the remaining members of the population as well as new, unseen samples with minimal distortion. This method is rooted on the principle of probability sampling, and works extremely well across a wide variety of data sets of diverse origin, structure, and dimensionality. This approach makes possible the multi-dimensional scaling of very large data sets, and, by capturing non-linear transforms in the form of analytical functions, opens new possibilities for the application of this invaluable statistical technique.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention and would be apparent to persons skilled in the relevant art(s).

These functional building blocks may be implemented by discrete components, application specific integrated circuits, processors executing appropriate software and the like or any combination thereof. It is well within the scope of one skilled in the relevant art(s) to develop the appropriate circuitry and/or software to implement these functional building blocks.

Based on the above descriptions and examples, a person skilled in the relevant art(s) will be able to implement the present invention in a wide variety of applications, all of which fall within the scope of the invention.

While various embodiments of the present invention have been described above, it should be understood that they have been presented by way of example only, and not limitation.

Thus, the breadth and scope of the present invention should not be limited by any of the above-described exemplary embodiments, but should be defined only in accordance with the following claims and their equivalents.

What is claimed is:

1. A scalable computer method for mapping large multi-dimensional data sets, comprising the steps of:
    (a) placing a sample of points from a multi-dimensional data set on a display map, each point in the sample of points having an associated set of N input coordinates and an associated set of M output coordinates, wherein N is greater than M;
    (b) selecting a sub-set of points from the sample of points, wherein the selected sub-set of points includes associated relationships between points in the selected sub-set;
    (c) revising the associated set of M output coordinates for at least one of the points of the sub-set of points based on the relationships between the points;
    (d) repeating steps (b) and (c) for additional sub-sets of points from the set of points;
    (e) determining at least one non-linear function for the non-linearly mapped sample of points that maps for each point in the sample of points the associated set of N input coordinates to the associated set of M output coordinates produced in steps (a) through (d); and
    (f) mapping additional points from the multi-dimensional data set using the at least one non-linear function determined in step (e), whereby the mapping generates M-dimensional output coordinates.

2. The method according to claim 1, further comprising selecting the sample of points at random.

3. The method according to claim 1, further comprising selecting the sample of points to reflect characteristics of the multi-dimensional data set.

4. The method according to claim 1, further comprising selecting the sample of points to reflect characteristics of a sub-set of the multi-dimensional data set.

5. The method according to claim 1, wherein the at least one non-linear function of step (e) is derived from a basis set of linear and non-linear functions.

6. The method according to claim 5, wherein the basis set includes at least one analytical function.

7. The method according to claim 5, wherein at least two functions of the basis set are combined in accordance with an optimization procedure to form the at least one non-linear function.

8. The method according to claim 7, wherein the at least two functions are combined in accordance with a Monte Carlo search procedure.

9. The method according to claim 7, wherein the at least two functions are combined in accordance with a simulated annealing procedure.

10. The method according to claim 7, wherein the at least two functions are combined in accordance with an evolutionary programming procedure.

11. The method according to claim 7, wherein the at least two functions are combined in accordance with a genetic algorithm.

12. The method according to claim 7, wherein the at least two functions are combined in accordance with a genetic programming procedure.

13. The method according to claim 7, wherein the at least two functions are combined in accordance with a gradient minimization procedure.

14. The method according to claim 5, wherein the basis set includes at least one function implemented using a look-up table.

15. The method according to claim 1, wherein the at least one non-linear function of step (e) is determined using a learning technique capable of substantially reproducing a given set of output coordinates from a given set of input coordinates.

16. The method according to claim 1, wherein the at least one non-linear function determined in step (e) is encoded using a neural network.

17. The method according to claim 16, wherein a parameter of the neural network is determined by a neural network training algorithm.

18. The method according to claim 1, wherein the at least one non-linear function is encoded using an associated neural network, wherein a parameter of each of the associated neural networks is determined by an associated neural network training algorithm.

19. The method according to claim 1, wherein step(f) comprises displaying the additional points on a display.

20. The method according to claim 1, wherein step (f) comprises mapping points from a second multi-dimensional data set, each point in the second multi-dimensional data set having an associated set of N input coordinates.

21. The method according to claim 1, wherein the multi-dimensional data set includes a set of database records having numerical fields.

22. The method according to claim 1, wherein the multi-dimensional data set includes chemical compounds characterized by a set of properties.

23. The method according to claim 1, wherein the multi-dimensional data set includes chemical compounds characterized by a set of properties.

24. The method according to claim 1, wherein the multi-dimensional data set includes chemical compounds characterized by a set of chemical properties.

25. The method according to claim 1, wherein the multi-dimensional data set includes protein sequences characterized by a set of properties.

26. The method according to claim 1, wherein the multi-dimensional data set includes gene sequences characterized by a set of properties.

27. A scalable computer method for mapping large multi-dimensional data sets, comprising the steps of:
   (a) placing a sample of points from a multi-dimensional data set on a display map, each point in the sample of points having an associated set of N input coordinates and an associated set of M output coordinates, wherein N is greater than M;
   (b) selecting a sub-set of points from the sample of points, wherein the selected sub-set of points includes associated relationships between points in the selected sub-set;
   (c) revising the associated set of M output coordinates for at least one of the points of the sub-set of points based on the relationships between the points;
   (d) repeating steps (b) and (c) for additional sub-sets of points from the set of points;
   (e) selecting a second sub-set of points from the sample of points;
   (f) determining a first non-linear function for the second sub-set of points that maps for each point in the second sub-set of points the associated set of N input coordinates to the associated set of M output coordinates produced in steps (a) through (d);
   (g) selecting a third sub-set of points from the sample of points;
   (h) determining a second non-linear function for the third sub-set of points that maps for each point in the third sub-set of points the associated set of N input coordinates to the associated set of M output coordinates produced in steps (a) through (d); and
   (i) mapping additional points from the multi-dimensional data set using the first non-linear function or the second non-linear function, whereby the mapping generates M-dimensional output coordinates.

28. The method according to claim 27, further comprising:
   selecting a fourth sub-set of points from the sample of points; and
   determining a third non-linear function for the fourth sub-set of points that maps for each point in the fourth sub-set of points the associated set of N input coordinates to the associated set of M output coordinates produced in steps (a) through (d).

29. The method according to claim 27, wherein a portion of the second sub-set of points and the third sub-set of points of the multi-dimensional data set overlap.

30. The method according to claim 27, wherein the second sub-set of points and the third sub-set of points of the multi-dimensional data set do not overlap.

31. The method according to claim 27, wherein step (i) comprises displaying the additional points on a display.

32. The method according to claim 27, wherein step (i) comprises selecting the first non-linear function or the second non-linear function to map a point of the additional points based on a set of approximated output coordinates associated with the point of the additional points.

33. The method according to claim 27, wherein step (i) comprises the steps of:
   associating an n-dimensional point with an input space of each of the non-linear functions;
   determining proximities between a point of the additional points and each of the n-dimensional points associated with the input space of each of the first and second non-linear functions; and
   selecting, based on the proximities, the first or second non-linear functions, to non-linearly map the point of the additional points.

34. The method according to claim 27, wherein step (i) comprises the steps of:
   associating an m-dimensional point with an output space of each of the non-linear functions;
   approximating m-dimensional coordinates for a point of the additional points using a non-linear mapping technique;
   determining proximities between the m-dimensional coordinates of the point of the additional points and the m-dimensional points associated with the output space of each of the non-linear functions; and
   selecting, based on the proximities, the first or second non-linear functions, to non-linearly map the point of the additional points.

* * * * *

UNITED STATES PATENT AND TRADEMARK OFFICE
CERTIFICATE OF CORRECTION

PATENT NO.   : 6,571,227 B1
DATED        : May 27, 2003
INVENTOR(S)  : Dimitris K. Agafiotis et al.

It is certified that error appears in the above-identified patent and that said Letters Patent is hereby corrected as shown below:

<u>Title page,</u>
Item [63], Related U.S. Application Data, delete "which is a continuation-in-part of application No. 08/963,872 filed on Nov. 11, 1997" and replace with -- which is a continuation-in-part of application No. 08/963,872 filed on Nov. 4, 1997 --

<u>Column 1,</u>
Lines 11-12, delete "which is a continuation-in-part of application No. 08/963,872 filed on Nov. 11, 1997" and replace with -- which is a continuation-in-part of application No. 08/963,872 filed on Nov. 4, 1997 --

Signed and Sealed this

Twenty-fifth Day of November, 2003

JAMES E. ROGAN
*Director of the United States Patent and Trademark Office*